(12) United States Patent
Huynh

(10) Patent No.: US 11,027,824 B2
(45) Date of Patent: Jun. 8, 2021

(54) DISTRIBUTED TRAILING EDGE WING FLAP SYSTEMS

(71) Applicant: The Boeing Company, Chicago, IL (US)

(72) Inventor: Neal V. Huynh, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 536 days.

(21) Appl. No.: 16/122,519

(22) Filed: Sep. 5, 2018

(65) Prior Publication Data

US 2020/0070959 A1 Mar. 5, 2020

(51) Int. Cl.
*B64C 13/40* (2006.01)
*B64C 13/50* (2006.01)

(52) U.S. Cl.
CPC .............. *B64C 13/40* (2013.01); *B64C 13/50* (2013.01)

(58) Field of Classification Search
CPC ....... B64C 13/40; B64C 13/505; B64C 13/42; B64C 13/50; B64C 13/503; B64C 9/16
See application file for complete search history.

(56) References Cited

U.S. PATENT DOCUMENTS 6,799,739 B1 10/2004 Jones
7,048,234 B2 * 5/2006 Recksiek ........... B64D 45/0005
244/213

(Continued)

FOREIGN PATENT DOCUMENTS

EP 1721825 11/2006
EP 1721826 11/2006

(Continued)

OTHER PUBLICATIONS

European Patent Office, "Extended European Search Report," issued in connection with European Patent Application No. 19193891.9, dated Feb. 12, 2020, 11 pages.

(Continued)

*Primary Examiner* — Justin M Benedik
(74) *Attorney, Agent, or Firm* — Hanley, Flight & Zimmerman, LLC

(57) ABSTRACT

Distributed trailing edge wing flap systems are described. An example wing flap system for an aircraft includes a flap and first and second actuators. The flap is movable between a deployed position and a retracted position relative to a fixed trailing edge of a wing of the aircraft. The first and second actuators are configured to move the flap relative to the fixed trailing edge. The first actuator is operatively coupled to the second actuator via a shaft. The first actuator is actuatable via pressurized hydraulic fluid to be supplied from a hydraulic system of the aircraft to the first actuator via a hydraulic module operatively coupled to the first actuator. The first actuator is configured to control movement of the second actuator via the shaft when the hydraulic system and the hydraulic module are functional. The second actuator is actuatable via an electric motor of the second actuator. The electric motor is selectively connectable to an electrical system of the aircraft. The electric motor is connected to the electrical system in response to detection of a failure of the hydraulic system or of the hydraulic module. The second actuator is configured to control movement of the first actuator via the shaft when the electric motor is connected to the electrical system.

22 Claims, 12 Drawing Sheets

(56) References Cited

U.S. PATENT DOCUMENTS

| | | |
|---|---|---|
| 8,434,301 B2 | 5/2013 | Fukui |
| 10,538,310 B2 | 1/2020 | Polcuch |
| 2004/0075020 A1* | 4/2004 | Trikha ................ B64C 13/505 244/99.4 |
| 2006/0043242 A1 | 3/2006 | Benson |
| 2006/0144996 A1 | 7/2006 | Carl et al. |
| 2010/0089053 A1 | 4/2010 | Hanlon et al. |
| 2010/0288886 A1* | 11/2010 | Schievelbusch ... B64D 45/0005 244/194 |
| 2011/0062282 A1* | 3/2011 | Richter ............. B64D 45/0005 244/99.4 |
| 2014/0175216 A1 | 6/2014 | Ishihara |
| 2015/0090843 A1 | 4/2015 | Guering |
| 2016/0009375 A1 | 1/2016 | Young et al. |
| 2018/0156293 A1 | 6/2018 | Fox et al. |
| 2018/0178902 A1 | 6/2018 | Nfonguem et al. |
| 2019/0217944 A1 | 7/2019 | Huynh |
| 2019/0291850 A1 | 9/2019 | Huynh |
| 2019/0308719 A1 | 10/2019 | Huynh |
| 2020/0079497 A1 | 3/2020 | Huynh |

FOREIGN PATENT DOCUMENTS

| | | |
|---|---|---|
| EP | 2202146 | 6/2010 |
| EP | 2524865 | 11/2012 |
| EP | 2955104 | 12/2015 |
| EP | 3121116 | 1/2017 |
| EP | 3549857 | 10/2019 |

OTHER PUBLICATIONS

European Patent Office, "Extended European Search Report," issued in connection with European Patent Application No. 19166351.7, dated Aug. 5, 2019, 6 pages.

United States Patent and Trademark Office, "Non-Final Office Action," issued in connection with U.S. Appl. No. 15/947,595, dated Aug. 6, 2020, 5 pages.

United States Patent and Trademark Office, "Requirement for Restriction," issued in connection with U.S. Appl. No. 15/926,477, dated Jul. 20, 2020, 6 pages.

United States Patent and Trademark Office, "Non-Final Office Action," issued in connection with U.S. Appl. No. 15/874,545, dated Aug. 18, 2020, 7 pages.

United States Patent and Trademark Office, "Non-Final Office Action," issued in connection with U.S. Appl. No. 16/126,671, dated Aug. 6, 2020, 7 pages.

United States Patent and Trademark Office, "Notice of Allowance" issued in connection with U.S. Appl. No. 15/926,477, dated Nov. 9, 2020, 8 pages.

* cited by examiner

DISTRIBUTED TRAILING EDGE WING FLAP SYSTEMS

FIELD OF THE DISCLOSURE

This disclosure relates generally to aircraft wing flaps and, more specifically, to distributed trailing edge wing flap systems.

BACKGROUND

Aircraft wings (e.g., the wings of a commercial aircraft) commonly include flaps (e.g., outboard flaps and/or inboard flaps) located at and/or along the respective fixed trailing edge of each aircraft wing. The flaps are movable relative to the fixed trailing edges of the aircraft wings between retracted and deployed positions. Deploying the flaps from the aircraft wings during flight (e.g., during landing) typically increases a lift characteristic associated with the aircraft wings, while retracting the flaps during flight (e.g., during cruise) typically reduces the lift characteristic.

SUMMARY

Distributed trailing edge wing flap systems are disclosed herein. In some examples, a wing flap system for an aircraft is disclosed. In some disclosed examples, the wing flap system comprises a flap and first and second actuators. In some disclosed examples, the flap is movable between a deployed position and a retracted position relative to a fixed trailing edge of a wing of the aircraft. In some disclosed examples, the first and second actuators are configured to move the flap relative to the fixed trailing edge. In some disclosed examples, the first actuator is operatively coupled to the second actuator via a shaft. In some disclosed examples, the first actuator is actuatable via pressurized hydraulic fluid to be supplied from a hydraulic system of the aircraft to the first actuator via a hydraulic module operatively coupled to the first actuator. In some disclosed examples, the first actuator is configured to control movement of the second actuator via the shaft when the hydraulic system and the hydraulic module are functional. In some disclosed examples, the second actuator is actuatable via an electric motor of the second actuator. In some disclosed examples, the electric motor is selectively connectable to an electrical system of the aircraft. In some disclosed examples, the electric motor is connected to the electrical system in response to detection of a failure of the hydraulic system or of the hydraulic module. In some disclosed examples, the second actuator is configured to control movement of the first actuator via the shaft when the electric motor is connected to the electrical system.

In some examples, a method for operating a wing flap system of an aircraft is disclosed. In some disclosed examples of the method, the wing flap system includes a flap movable between a deployed position and a retracted position relative to a fixed trailing edge of a wing of the aircraft, and further includes first and second actuators configured to move the flap relative to the fixed trailing edge, the first actuator being operatively coupled to the second actuator via a shaft. In some disclosed examples, the method comprises commanding the first actuator to control movement of the flap relative to the fixed trailing edge. In some disclosed examples, the first actuator is actuatable via pressurized hydraulic fluid to be supplied from a hydraulic system of the aircraft to the first actuator via a hydraulic module operatively coupled to the first actuator. In some disclosed examples, the first actuator controls movement of the second actuator via the shaft when the hydraulic system and the hydraulic module are functional. In some disclosed examples, the method comprises detecting a failure of the hydraulic system or of the hydraulic module. In some disclosed examples, the method comprises commanding the second actuator to control movement of the flap relative to the fixed trailing edge. In some disclosed examples, the second actuator is actuatable via an electric motor of the second actuator. In some disclosed examples, the electric motor is selectively connectable to an electrical system of the aircraft. In some disclosed examples, the electric motor is connected to the electrical system in response to the detecting the failure. In some disclosed examples, the second actuator controls movement of the first actuator via the shaft when the electric motor is connected to the electrical system.

Figure 1:
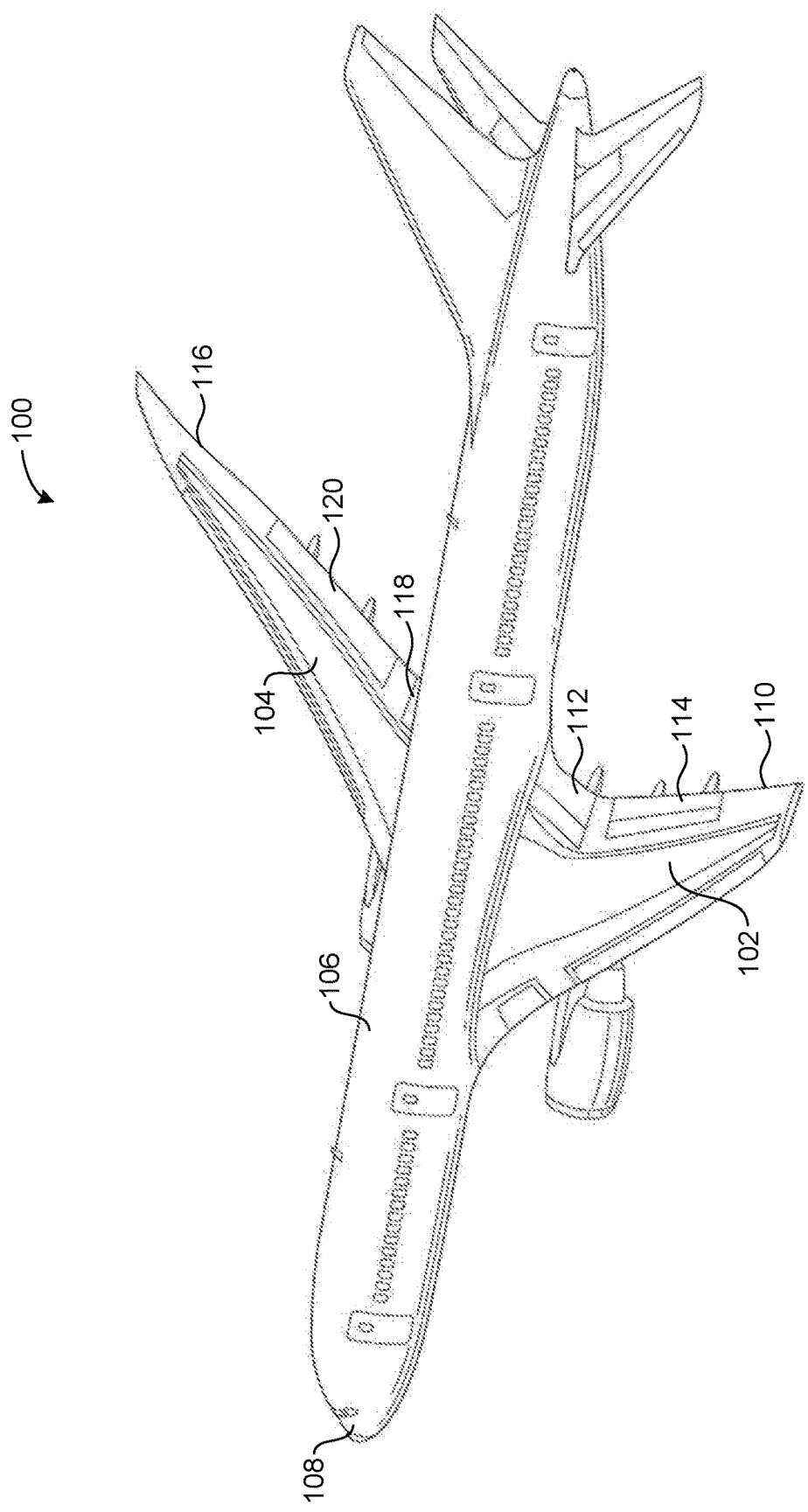
FIG. 1 illustrates an example aircraft in which an example distributed trailing edge wing flap system can be implemented in accordance with the teachings of this disclosure.

Certain examples are shown in the above-identified figures and described in detail below. In describing these examples, like or identical reference numbers are used to identify the same or similar elements. The figures are not necessarily to scale, and certain features and certain views of the figures may be shown exaggerated in scale or in schematic for clarity and/or conciseness.

DETAILED DESCRIPTION

Aircraft wings (e.g., the wings of a commercial aircraft) commonly include flaps (e.g., outboard flaps and/or inboard flaps) located at and/or along the respective fixed trailing edge of each aircraft wing. Conventional trailing edge wing flap systems may include actuators and/or ball screws arranged to move the flaps relative to the fixed trailing edges of the aircraft wings between retracted and deployed positions. In such conventional trailing edge wing flap systems, the actuators are connected via torque tubes to a power drive unit which is powered by multiple independent hydraulic or electrical systems of the aircraft. The actuators of such conventional trailing edge wing flap systems can be rendered inoperable in the event of a partial or complete failure of one or more of the hydraulic or electrical system(s), thereby leaving the aircraft without the ability to change and/or control the respective positions of the wing flaps (e.g., without the ability to maintain and/or to actuate a wing flap to the last commanded position of the wing flap).

In contrast to the conventional trailing edge wing flap systems described above, the example distributed trailing edge wing flap systems disclosed herein advantageously include a hydromechanical actuator and an electromechanical actuator to move a wing flap relative to the fixed trailing edge of an aircraft wing. The hydromechanical actuator is actuatable via pressurized hydraulic fluid to be supplied from a hydraulic system of the aircraft to the hydromechanical actuator via a hydraulic module operatively coupled to the hydromechanical actuator. The electromechanical actuator is actuatable via an electric motor of the electromechanical actuator that is selectively connectable to an electrical system of the aircraft. A shaft operatively couples the hydromechanical actuator to the electromechanical actuator.

The hydromechanical actuator can advantageously be actuated by either of two independent mechanisms. First, the hydromechanical actuator can be actuated via the hydraulic module when the hydraulic system is operational, functional, and/or active. Second, in the event of a failure of the hydraulic system, the hydromechanical actuator can alternatively be actuated via the shaft under the control of the electromechanical actuator.

The electromechanical actuator can also advantageously be actuated by either of two independent mechanisms. First, the electromechanical actuator can be actuated via the shaft under the control of the hydromechanical actuator when the hydraulic system is operational, functional, and/or active. Second, in the event of a failure of the hydraulic system, the electromechanical actuator can alternatively be actuated via the electric motor of the electromechanical actuator in response to the electric motor being connected to the electrical system.

FIG. 1 illustrates an example aircraft 100 in which an example distributed trailing edge wing flap system can be implemented in accordance with the teachings of this disclosure. Example distributed trailing edge wing flap systems disclosed herein can be implemented in commercial aircraft (e.g., the aircraft 100 of FIG. 1) as well as other types of aircraft (e.g., military aircraft, unmanned aerial vehicles, etc.). The aircraft 100 of FIG. 1 includes an example first wing 102, an example second wing 104, an example fuselage 106, and an example cockpit area 108. The first wing 102 includes an example first fixed trailing edge 110, an example first inboard flap 112, and an example first outboard flap 114. The first inboard flap 112 and the first outboard flap 114 are respectively located at and/or along the first fixed trailing edge 110 of the first wing 102. The second wing 104 includes an example second fixed trailing edge 116, an example second inboard flap 118, and an example second outboard flap 120. The second inboard flap 118 and the second outboard flap 120 are respectively located at and/or along the second fixed trailing edge 116 of the second wing 104.

In the illustrated example of FIG. 1, the first inboard flap 112 and the first outboard flap 114 are shown in respective retracted positions relative to the first fixed trailing edge 110 of the first wing 102, and the second inboard flap 118 and the second outboard flap 120 are shown in respective retracted positions relative to the second fixed trailing edge 116 of the second wing 104. The first inboard flap 112 and the first outboard flap 114 are movable and/or actuatable between the respective retracted positions shown in FIG. 1 and respective deployed positions in which the first inboard flap 112 and the first outboard flap 114 are extended rearward and/or downward from the first fixed trailing edge 110 of the first wing 102. The second inboard flap 118 and the second outboard flap 120 are similarly movable and/or actuatable between the respective retracted positions shown in FIG. 1 and respective deployed positions in which the second inboard flap 118 and the second outboard flap 120 are extended rearward and/or downward from the second fixed trailing edge 116 of the second wing 104. In some examples, respective ones of the wing flaps (e.g., the first inboard flap 112, the first outboard flap 114, the second inboard flap 118, and/or the second outboard flap 120) can be movable and/or actuatable to a variety of deployed positions corresponding to desired and/or commanded detents of the flaps (e.g., flaps thirty (F30), flaps forty (F40), etc.).

Figure 2A:
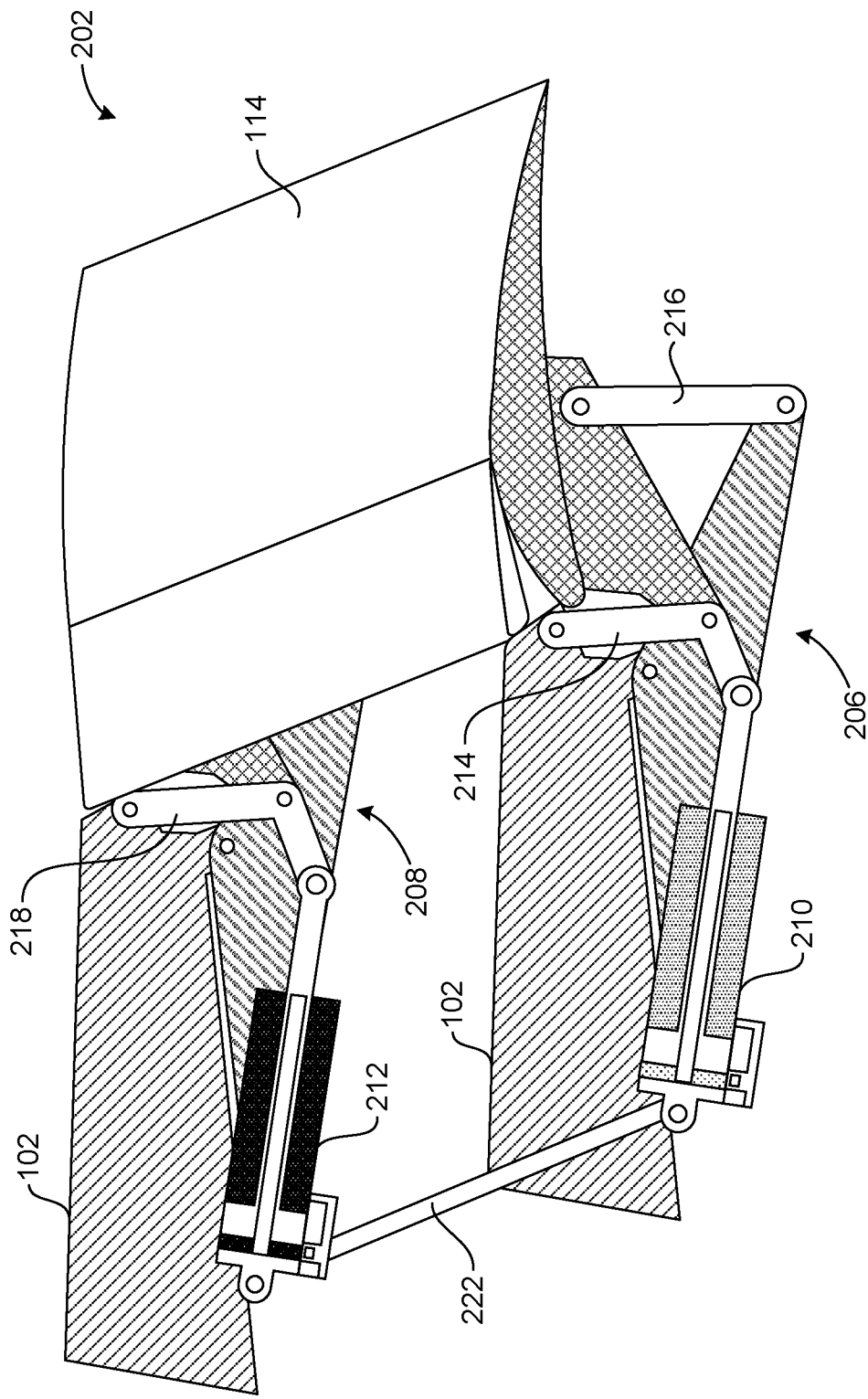
FIG. 2A is a perspective view of the example first outboard flap of the example first wing of FIG. 1 in an example retracted position.
Figure 2B:
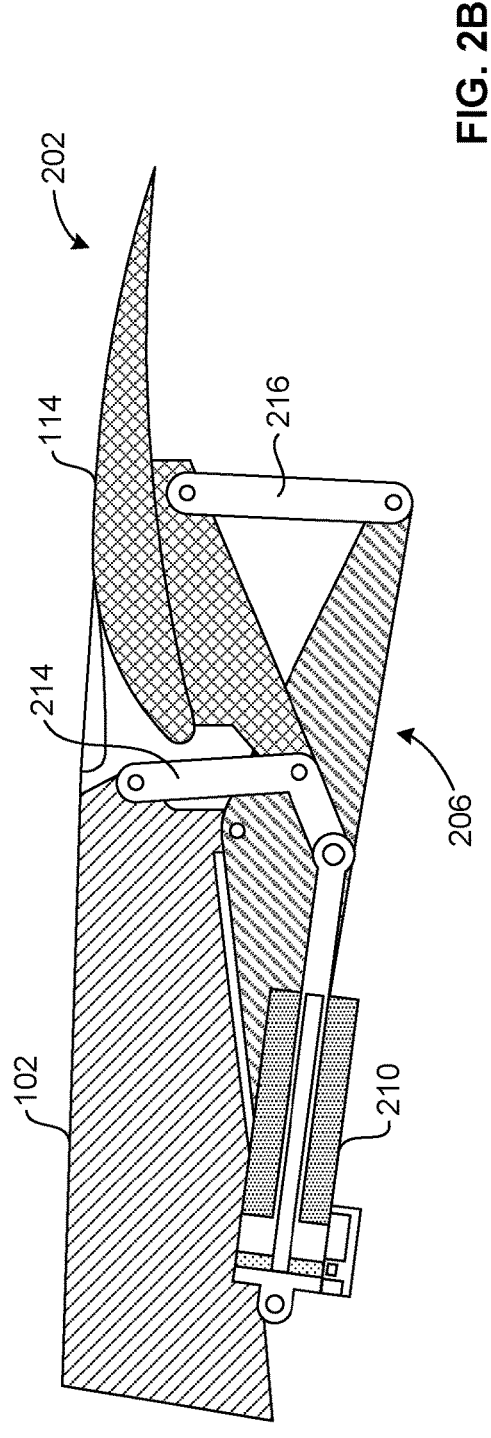
FIG. 2B is a first cross-sectional view of the example first outboard flap of the example first wing of FIG. 1 in the example retracted position of FIG. 2A.
Figure 2C:
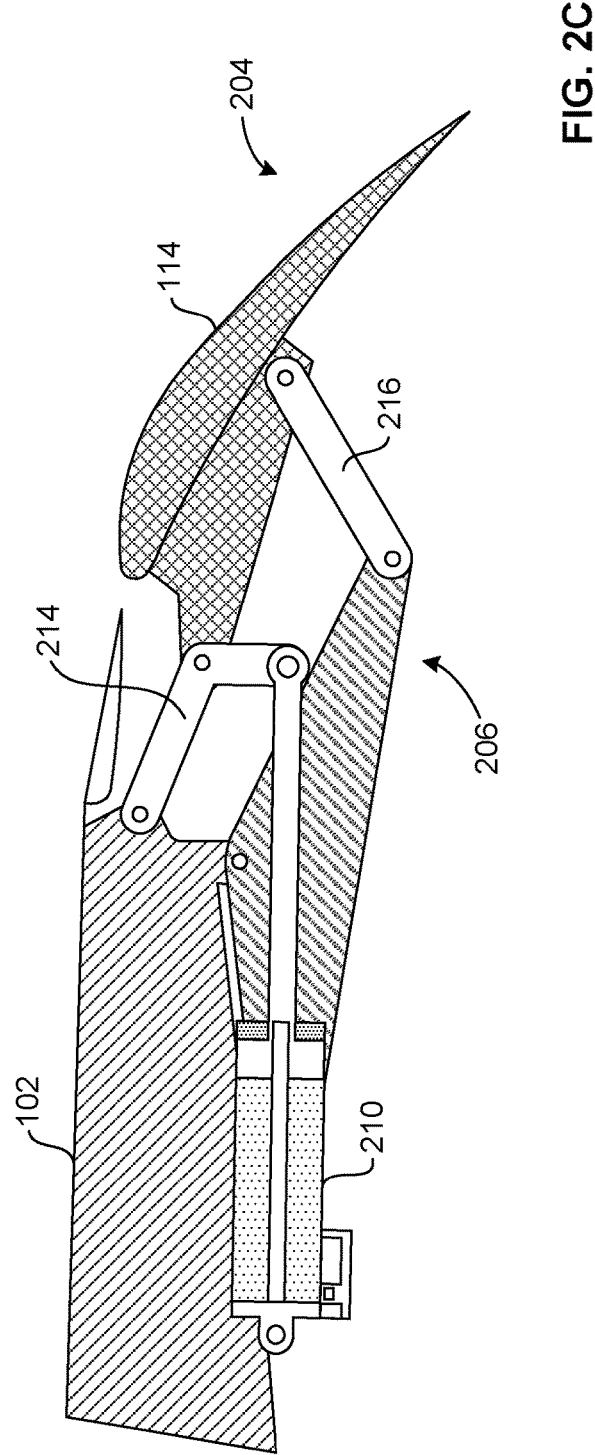
FIG. 2C is a first cross-sectional view of the example first outboard flap of the example first wing of FIG. 1 in an example deployed position.
Figure 2D:
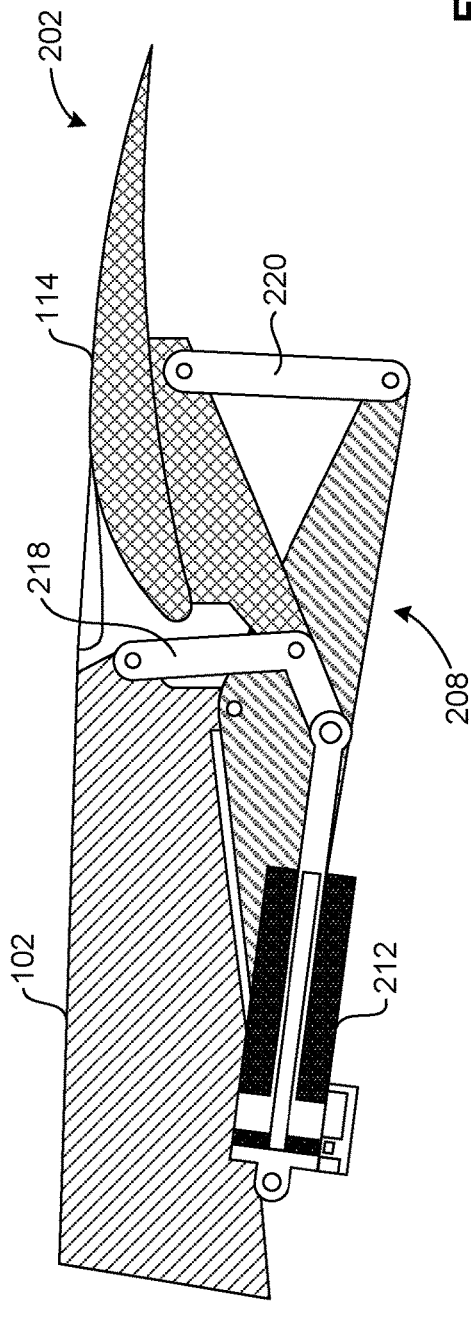
FIG. 2D is a second cross-sectional view of the example first outboard flap of the example first wing of FIG. 1 in the example retracted position of FIGS. 2A and 2B.
Figure 2E:
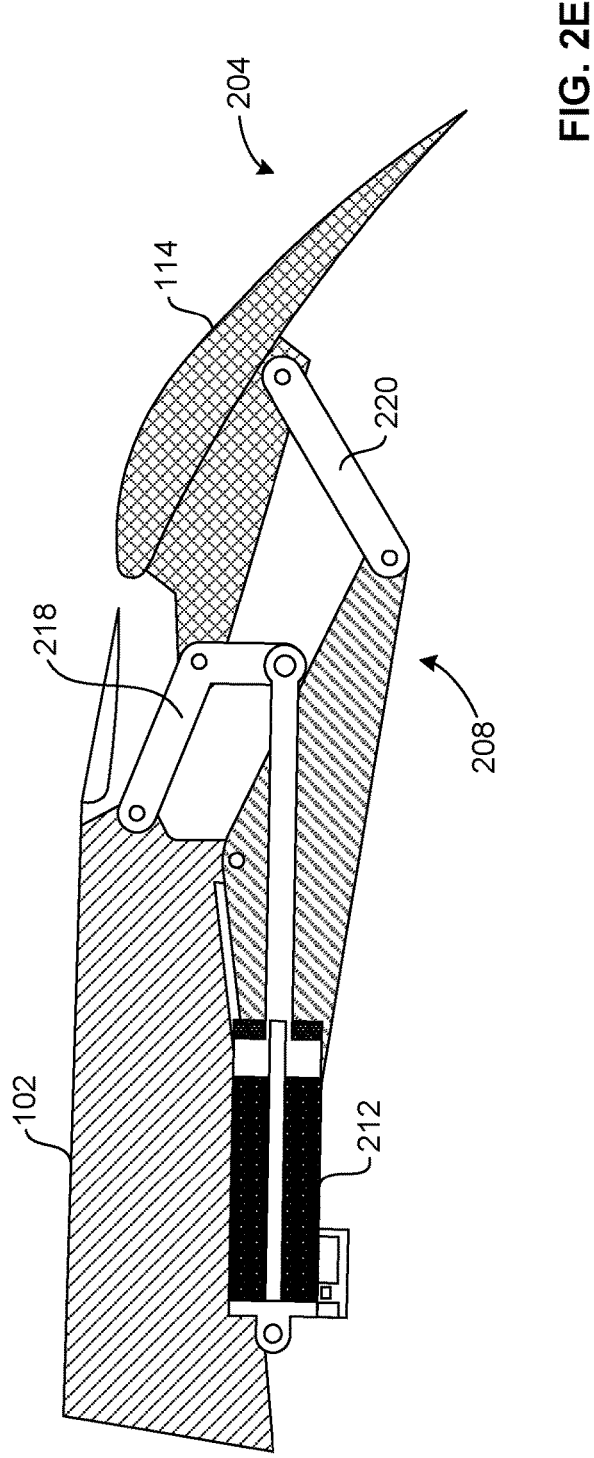
FIG. 2E is a second cross-sectional view of the example first outboard flap of the example first wing of FIG. 1 in the example deployed position of FIG. 2C.

In some examples, respective ones of the wing flaps (e.g., the first inboard flap 112, the first outboard flap 114, the second inboard flap 118, and/or the second outboard flap 120) can be movable and/or actuatable between a retracted position and a deployed position via one or more actuator(s) (e.g., one or more hydromechanical actuator(s), one or more electromechanical actuator(s), etc.). FIG. 2A is a perspective view of the example first outboard flap 114 of the example first wing 102 of FIG. 1 in an example retracted position 202. FIG. 2B is a first cross-sectional view of the example first outboard flap 114 of the example first wing 102 of FIG. 1 in the example retracted position 202 of FIG. 2A. FIG. 2C is a first cross-sectional view of the example first outboard flap 114 of the example first wing 102 of FIG. 1 in an example deployed position 204. The cross-sectional views of FIGS. 2B and 2C are taken at the hydromechanical actuator of FIG. 2A. FIG. 2D is a second cross-sectional view of the example first outboard flap 114 of the example first wing 102 of FIG. 1 in the example retracted position 202 of FIGS. 2A and 2B. FIG. 2E is a second cross-sectional view of the example first outboard flap 114 of the example first wing 102 of FIG. 1 in the example deployed position 204 of FIG. 2C. The cross-sectional views of FIGS. 2D and 2E are taken at the electromechanical actuator of FIG. 2A.

In the illustrated examples of FIGS. 2A-2E, the first outboard flap 114 is coupled to the first wing 102 via a first example linkage assembly 206 and a second example linkage assembly 208. The first outboard flap 114 is movable and/or actuatable between the retracted position 202 of FIGS. 2A, 2B and 2D and the deployed position 204 of FIGS. 2C and 2E via an example hydromechanical actuator (HMA) 210 coupled to the first linkage assembly 206 and to the first wing 102, and via an example electromechanical actuator (EMA) 212 coupled to the second linkage assembly 208 and to the first wing 102.

The first linkage assembly 206 of FIGS. 2A-2C includes an example first link 214 and an example second link 216. In the illustrated example of FIGS. 2A-2C, the first link 214 of the first linkage assembly 206 extends from the HMA 210 to the first outboard flap 114, and also extends to the first wing 102. The second link 216 of the first linkage assembly 206 extends from the first wing 102 to the first outboard flap 114. In other examples, the configuration of the first link 214 and/or the second link 216 of the first linkage assembly 206 can differ from that shown in FIGS. 2A-2C. In still other examples, the first linkage assembly 206 of FIGS. 2A-2C can include additional (e.g., a third, a fourth, a fifth, a sixth, etc.) links beyond the first and second links 214, 216 described above.

In the illustrated examples of FIGS. 2A-2C, the HMA 210 can be powered, controlled, and/or operated via a hydraulic module operatively coupled to the HMA 210. The hydraulic module can be located within the first wing 102 of the aircraft 100. The hydraulic module can be powered, controlled, and/or operated via a remote electronics unit (REU) operatively coupled to the hydraulic module. The REU can be located within the first wing 102 of the aircraft 100. The REU can be powered, controlled, and/or operated via one or more flight control electronics unit(s) (FCEU) operatively coupled to the REU and located within the fuselage 106 of the aircraft 100. The one or more FCEU(s) can be controlled and/or operated based on one or more input(s) received from a flap lever and/or a pilot control inceptor operatively coupled to the FCEU(s) and located in the cockpit area 108 of the aircraft 100.

The second linkage assembly 208 of FIGS. 2A, 2D and 2E includes an example first link 218 and an example second link 220. In the illustrated example of FIGS. 2A, 2D and 2E, the first link 218 of the second linkage assembly 208 extends from the EMA 212 to the first outboard flap 114, and also extends to the first wing 102. The second link 220 of the second linkage assembly 208 extends from the first wing 102 to the first outboard flap 114. In other examples, the configuration of the first link 218 and/or the second link 220 of the second linkage assembly 208 can differ from that shown in FIGS. 2A, 2D and 2E. In still other examples, the second linkage assembly 208 of FIGS. 2A, 2D and 2E can include additional (e.g., a third, a fourth, a fifth, a sixth, etc.) links beyond the first and second links 218, 220 described above.

In the illustrated examples of FIGS. 2A, 2D and 2E, the EMA 212 can be powered, controlled, and/or operated via an electric motor operatively coupled to the EMA 212. The electric motor can be located within the first wing 102 of the aircraft 100. The electric motor can be powered, controlled, and/or operated via an electronic motor control unit (EMCU) operatively coupled to the electric motor. The EMCU can be located within the first wing 102 of the aircraft 100. The EMCU can be powered by an electrical system of the aircraft 100 that is selectively connectable to the EMCU. The EMCU can be controlled and/or operated via a flight control electronics unit (FCEU) operatively coupled to the EMCU and located within the fuselage 106 of the aircraft 100. The FCEU can be controlled and/or operated based on one or more input(s) received from a flap lever and/or a pilot control inceptor operatively coupled to the FCEU and located in the cockpit area 108 of the aircraft 100.

As shown in FIG. 2A, the HMA 210 of FIGS. 2A-2C is operatively coupled (e.g., in mechanical communication with) the EMA 212 of FIGS. 2A, 2D and 2E via an example shaft 222. In the illustrated example of FIG. 2A, the shaft 222 transfers rotational motion and torque from a gear train of the HMA 210 to a gear train of the EMA 212, and vice-versa. For example, as further described below in connection with FIGS. 4, 5 and 8, the shaft 222 can transfer rotational motion and torque from a gear train of the HMA 210 to a gear train of the EMA 212 in response to a load applied to the shaft 222. In some examples, the shaft 222 can be implemented as a straight shaft that is configured to transmit rotational motion and torque between two components (e.g., a gear train of the HMA 210 and a gear train of the EMA 212) that are aligned. In other examples, the shaft 222 can alternatively be implemented as a flexible shaft that is configured to transmit rotational motion and torque between two components (e.g., a gear train of the HMA 210 and a gear train of the EMA 212) that are not aligned.

Figure 3:
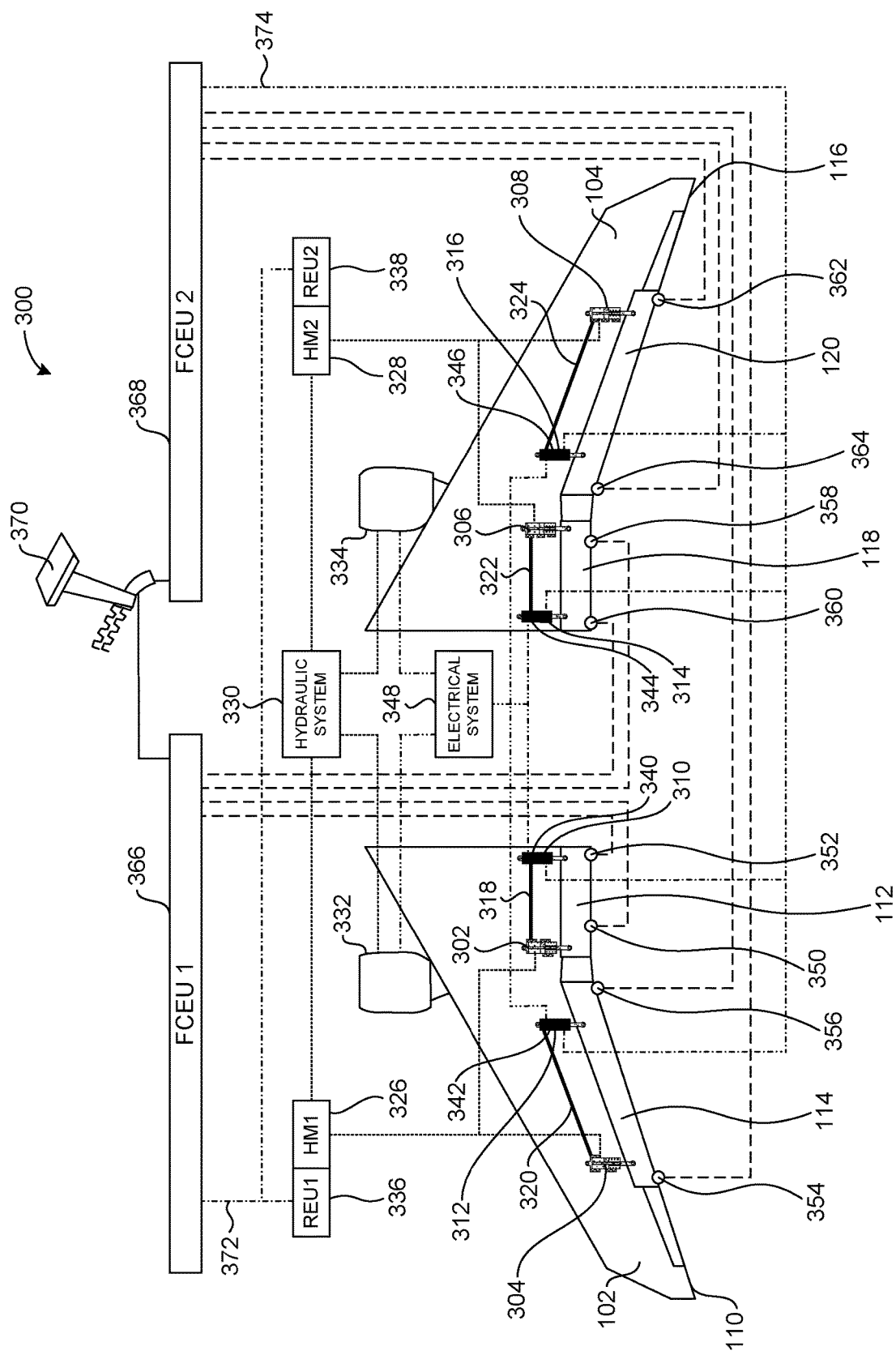
FIG. 3 is a schematic of an example distributed trailing edge wing flap system constructed in accordance with the teachings of this disclosure.

FIG. 3 is a schematic of an example distributed trailing edge wing flap system 300 constructed in accordance with the teachings of this disclosure. The distributed trailing edge wing flap system 300 of FIG. 3 can be implemented in the example aircraft 100 of FIG. 1 described above. In the illustrated example of FIG. 3, the distributed trailing edge wing flap system includes the first wing 102, the second wing 104, the first fixed trailing edge 110, the first inboard flap 112, the first outboard flap 114, the second fixed trailing edge 116, the second inboard flap 118, and the second outboard flap 120 of FIG. 1 described above.

The distributed trailing edge wing flap system 300 of FIG. 3 also includes a first example HMA 302, a second example HMA 304, a third example HMA 306, a fourth example HMA 308, a first example EMA 310, a second example EMA 312, a third example EMA 314, and a fourth example EMA 316. In the illustrated example of FIG. 3, the first HMA 302 and the first EMA 310 are respectively coupled to the first inboard flap 112 and to the first wing 102. The second HMA 304 and the second EMA 312 are respectively coupled to the first outboard flap 114 and to the first wing 102. The third HMA 306 and the third EMA 314 are respectively coupled to the second inboard flap 118 and to the second wing 104. The fourth HMA 308 and the fourth EMA 316 are respectively coupled to the second outboard flap 120 and to the second wing 104. An example HMA that can be used to implement respective ones of the first, second, third and fourth HMAs 302, 304, 306, 308 of FIG. 3 is further described below in connection with FIGS. 4-7. An example EMA that can be used to implement respective ones of the first, second, third and fourth EMAs 310, 312, 314, 316 of FIG. 3 is further described below in connection with FIGS. 4 and 8.

The first, second, third and fourth HMAs 302, 304, 306, 308 and the first, second, third and fourth EMAs 310, 312, 314, 316 respectively move and/or actuate correspondingly coupled ones of the first inboard flap 112, the first outboard flap 114, the second inboard flap 118, and the second outboard flap 120 between respective retracted positions and respective deployed positions. For example, in the illustrated example of FIG. 3, the first HMA 302 and the first EMA 310 move and/or actuate the first inboard flap 112 between a retracted position (as shown in FIG. 3) and a deployed position relative the first fixed trailing edge 110 of the first wing 102. The second HMA 304 and the second EMA 312 move and/or actuate the first outboard flap 114 between a retracted position (as shown in FIG. 3) and a deployed position relative the first fixed trailing edge 110 of the first wing 102. The third HMA 306 and the third EMA 314 move and/or actuate the second inboard flap 118 between a retracted position (as shown in FIG. 3) and a deployed position relative the second fixed trailing edge 116 of the second wing 104. The fourth HMA 308 and the fourth EMA 316 move and/or actuate the second outboard flap 120 between a retracted position (as shown in FIG. 3) and a deployed position relative the second fixed trailing edge 116 of the second wing 104.

Although not visible in FIG. 3, respective ones of the first, second, third and fourth HMAs 302, 304, 306, 308 and respective ones of the first, second, third and fourth EMAs 310, 312, 314, 316 include an actuator position feedback sensor to sense, measure and/or detect a position of the HMA or EMA. In some examples, the position of the HMA or EMA sensed, measured and/or detected via the actuator position feedback sensor can correspond to and/or indicate a position (e.g., a retracted position, a deployed position, etc.) of the corresponding wing flap to which the HMA or EMA is coupled. An actuator position feedback sensor that can be included in and/or implemented by respective ones of the first, second, third and fourth HMAs 302, 304, 306, 308 of FIG. 3 is further described below in connection with FIG. 5. An actuator position feedback sensor that can be included in and/or implemented by respective ones of the first, second, third and fourth EMAs 310, 312, 314, 316 of FIG. 3 is further described below in connection with FIG. 8.

The distributed trailing edge wing flap system 300 of FIG. 3 also includes a first example shaft 318, a second example shaft 320, a third example shaft 322, and a fourth example shaft 324. Respective ones of the first, second, third and fourth shafts 318, 320, 322, 324 operatively couple (e.g., mechanically couple) corresponding respective ones of the first, second, third and fourth HMAs 302, 304, 306, 308 to corresponding respective ones of the first, second, third and fourth EMAs 310, 312, 314, 316. For example, in the illustrated example of FIG. 3, the first shaft 318 operatively couples the first HMA 302 to the first EMA 310 such that motion and/or movement of the first HMA 302 is transferred via the first shaft 318 to the first EMA 310, or vice-versa. The second shaft 320 operatively couples the second HMA 304 to the second EMA 312 such that motion and/or movement of the second HMA 304 is transferred via the second shaft 320 to the second EMA 312, or vice-versa. The third shaft 322 operatively couples the third HMA 306 to the third EMA 314 such that motion and/or movement of the third HMA 306 is transferred via the third shaft 322 to the third EMA 314, or vice-versa. The fourth shaft 324 operatively couples the fourth HMA 308 to the fourth EMA 316 such that motion and/or movement of the fourth HMA 308 is transferred via the fourth shaft 324 to the fourth EMA 316, or vice-versa. In some examples, the respective locations of an HMA and an EMA that are operatively coupled via a shaft (e.g., the first HMA 302 and the first EMA 310 operatively coupled via the first shaft 318) are optimized within and/or along the flap such that the length of the shaft is as short as possible.

Respective ones of the first, second, third and fourth shafts 318, 320, 322, 324 of FIG. 3 transfer rotational motion and torque from a gear train of a corresponding one of the first, second, third and fourth HMAs 302, 304, 306, 308 to a gear train of a corresponding one of the first, second, third and fourth EMAs 310, 312, 314, 316, and vice-versa. For example, the first shaft 318 can transfer rotational motion and torque from a gear train of the first HMA 302 to a gear train of the first EMA 310. In some examples, respective ones of the first, second, third and fourth shafts 318, 320, 322, 324 can be implemented as a straight shaft that is configured to transmit rotational motion and torque between two components (e.g., a gear train of a corresponding one of the first, second, third and fourth HMAs 302, 304, 306, 308 and a gear train of a corresponding one of the first, second, third and fourth EMAs 310, 312, 314, 316) that are aligned. In other examples, respective ones of the first, second, third and fourth shafts 318, 320, 322, 324 can alternatively be implemented as a flexible shaft that is configured to transmit rotational motion and torque between two components (e.g., a gear train of a corresponding one of the first, second, third and fourth HMAs 302, 304, 306, 308 and a gear train of a corresponding one of the first, second, third and fourth EMAs 310, 312, 314, 316) that are aligned. An example shaft that can be used to implement respective ones of the first, second, third and fourth shafts 318, 320, 322, 324 of FIG. 3 is further described below in connection with FIGS. 4, 5 and 8.

The distributed trailing edge wing flap system 300 of FIG. 3 also includes a first example hydraulic module 326 and a second example hydraulic module 328. In some examples, the first hydraulic module 326 is located within the first wing 102, and the second hydraulic module 328 is located within the second wing 104. In the illustrated example of FIG. 3, the first hydraulic module 326 is operatively coupled to (e.g., in fluid communication with) and located remotely from the first HMA 302 and the second HMA 304. The second hydraulic module 328 is operatively coupled to (e.g., in fluid communication with) and located remotely from the third HMA 306 and the fourth HMA 308. In some examples, locating the first and second hydraulic modules 326, 328 remotely from the first, second, third and fourth HMAs 302, 304, 306, 308 advantageously enables the dimensions (e.g., widths and/or lengths) of aerodynamic fairings that respectively house the first, second, third and fourth HMAs 302, 304, 306, 308 to be reduced (e.g., minimized) and/or aerodynamically optimized. In some examples, implementing one hydraulic module to provide pressurized hydraulic fluid to at least two HMAs (e.g., implementing the first hydraulic module 326 to provide pressurized hydraulic fluid to the first and second HMAs 302, 304) advantageously increases (e.g., maximizes) an available volume for other system components and/or equipment to be installed aft of the rear spar of the wing of the aircraft. An example hydraulic module that can be used to implement respective ones of the first and second hydraulic modules 326, 328 of FIG. 3 is further described below in connection with FIGS. 4, 6 and 7.

The distributed trailing edge wing flap system 300 of FIG. 3 also includes an example hydraulic system 330 powered by a first example engine 332 and/or a second example engine 334. In the illustrated example of FIG. 3, the first engine 332 is coupled to the first wing 102, and the second engine 334 is coupled to the second wing 104. The first engine 332 and/or the second engine 334 power(s) the hydraulic system 330 to supply pressurized hydraulic fluid to respective ones of the first and second hydraulic modules 326, 328.

Pressurized hydraulic fluid supplied via the hydraulic system 330 of FIG. 3 to the first hydraulic module 326 can be delivered to respective ones of the first and second HMAs 302, 304 to move and/or actuate the first and second HMAs 302, 304. Pressurized hydraulic fluid contained within respective ones of the first and second HMAs 302, 304 can be returned to the hydraulic system 330 via the first hydraulic module 326. Pressurized hydraulic fluid supplied via the hydraulic system 330 of FIG. 3 to the second hydraulic module 328 can be delivered to respective ones of the third and fourth HMAs 306, 308 to move and/or actuate the third and fourth HMAs 306, 308. Pressurized hydraulic fluid contained within respective ones of the third and fourth HMAs 306, 308 can be returned to the hydraulic system 330 via the second hydraulic module 328.

The distributed trailing edge wing flap system 300 of FIG. 3 also includes a first example REU 336 and a second example REU 338. In some examples, the first REU 336 is located within the first wing 102, and the second REU 338 is located within the second wing 104. In the illustrated example of FIG. 3, the first REU 336 is located at and is operatively coupled to (e.g., in electrical communication with) the first hydraulic module 326, and the second REU 338 is located at and is operatively coupled to (e.g., in electrical communication with) the second hydraulic module 328. As further described below in connection with FIGS. 4-7, the first REU 336 controls the first hydraulic module 326, and the second REU 338 controls the second hydraulic module 328.

In some examples, the first REU 336 is further operatively coupled to (e.g., in electrical communication with) the actuator position feedback sensor(s) of the first HMA 302 and/or the second HMA 304, and the second REU 338 is further operatively coupled to (e.g., in electrical communication with) the actuator position feedback sensor(s) of the third HMA 306 and/or the fourth HMA 308. In such examples, the first REU 336 can control the first hydraulic module 326 based on actuator position feedback data obtained by the first REU 336 from the first and/or second actuator position feedback sensor(s) of corresponding ones of the first and/or second HMA(s) 302, 304, as further described below in connection with FIGS. 4-7. Similarly, the second REU 338 can control the second hydraulic module 328 based on actuator position feedback data obtained by the second REU 338 from the third and/or fourth actuator position feedback sensor(s) of corresponding ones of the third and/or fourth HMA(s) 306, 308.

The distributed trailing edge wing flap system 300 of FIG. 3 also includes a first example EMCU 340, a second example EMCU 342, a third example EMCU 344, and a fourth example EMCU 346. In some examples, the first and second EMCUs 340, 342 are located within the first wing 102, and the third and fourth EMCUs 344, 346 are located within the second wing 104. In the illustrated example of FIG. 3, the first EMCU 340 is located at and is operatively coupled to (e.g., in electrical communication with) the first EMA 310, the second EMCU 342 is located at and is operatively coupled to (e.g., in electrical communication with) the second EMA 312, the third EMCU 344 is located at and is operatively coupled to (e.g., in electrical communication with) the third EMA 314, and the fourth EMCU 346 is located at and is operatively coupled to (e.g., in electrical communication with) the fourth EMA 316. Respective ones of the first, second, third and fourth EMCUs 340, 342, 344, 346 control corresponding respective ones of first, second, third and fourth electric motors of corresponding respective ones of the first, second, third and fourth EMAs 310, 312, 314, 316, as further described below in connection with FIGS. 4 and 8.

In some examples, the first EMCU 340 is further operatively coupled to (e.g., in electrical communication with) the actuator position feedback sensor of the first EMA 310, the second EMCU 342 is further operatively coupled to the actuator position feedback sensor of the second EMA 312, the third EMCU 344 is further operatively coupled to the actuator position feedback sensor of the third EMA 314, and the fourth EMCU 346 is further operatively coupled to the actuator position feedback sensor of the fourth EMA 316. In such examples, respective ones of the first, second, third and fourth EMCUs 340, 342, 344, 346 can control corresponding respective ones of first, second, third and fourth electric motors of corresponding respective ones of the first, second, third and fourth EMAs 310, 312, 314, 316 based on actuator position feedback data obtained by respective ones of the first, second, third and fourth EMCUs 340, 342, 344, 346 from corresponding respective ones of the first, second, third and fourth actuator position feedback sensors of corresponding respective ones of the first, second, third and fourth EMAs 310, 312, 314, 316, as further described below in connection with FIGS. 4 and 8.

Although not visible in FIG. 3, the first EMCU 340 includes a first switch, the second EMCU 342 includes a second switch, the third EMCU 344 includes a third switch, and the fourth EMCU 346 includes a fourth switch. In some examples, the first, second, third and/or fourth EMCU(s) 340, 342, 344, 346 can be activated via corresponding ones of the first, second, third and/or fourth switch(es) to control corresponding ones of the first, second, third and/or fourth electric motor(s) of the first, second, third and/or fourth EMA(s) 310, 312, 314, 316. Activation of the first, second, third and/or fourth EMCU(s) 340, 342, 344, 346 can occur in response to an FCEU (further described below) detecting a failure (e.g., loss or reduction of pressurized hydraulic fluid) of the hydraulic system 330 of FIG. 3. An example EMCU that can be used to implement respective ones of the first, second, third and fourth EMCUs 340, 342, 344, 346 of FIG. 3 is further described below in connection with FIGS. 4 and 8.

The distributed trailing edge wing flap system 300 of FIG. 3 also includes an example electrical system 348 powered by the first engine 332 and/or the second engine 334. In the illustrated example of FIG. 3, the first engine 332 is coupled to the first wing 102, and the second engine 334 is coupled to the second wing 104. The first engine 332 and/or the second engine 334 power(s) the electrical system 348 to supply electrical power. The electrical system 348 (including the electrical power supplied and/or delivered thereby) is selectively connectable and/or selectively deliverable to the first electric motor of the first EMA 310 via the first EMCU 340, is selectively connectable and/or selectively deliverable to the second electric motor of the second EMA 312 via the second EMCU 342, is selectively connectable and/or selectively deliverable to the third electric motor of the third EMA 314 via the third EMCU 344, and is selectively connectable and/or selectively deliverable to the fourth electric motor of the fourth EMA 316 via the fourth EMCU 346.

The distributed trailing edge wing flap system 300 of FIG. 3 also includes a first example flap position sensor 350, a second example flap position sensor 352, a third example flap position sensor 354, a fourth example flap position sensor 356, a fifth example flap position sensor 358, a sixth example flap position sensor 360, a seventh example flap position sensor 362, and an eighth example flap position sensor 364. In the illustrated example of FIG. 3, the first flap position sensor 350 and the second flap position sensor 352 are respectively coupled to the first inboard flap 112 of the first wing 102. The third flap position sensor 354 and the fourth flap position sensor 356 are respectively coupled to the first outboard flap 114 of the first wing 102. The fifth flap position sensor 358 and the sixth flap position sensor 360 are respectively coupled to the second inboard flap 118 of the second wing 104. The seventh flap position sensor 362 and the eighth flap position sensor 364 are respectively coupled to the second outboard flap 120 of the second wing 104. Respective ones of the first, second, third, fourth, fifth, sixth, seventh and eighth flap position sensors 350, 352, 354, 356, 358, 360, 362, 364 sense, measure and/or detect a position of a correspondingly coupled one of the first inboard flap 112, the first outboard flap 114, the second inboard flap 118, and the second outboard flap 120. For example, the first flap position sensor 350 and the second flap position sensor 352 can respectively sense, measure and/or detect a position of the first inboard flap 112 of the first wing 102 relative to the first fixed trailing edge 110 of the first wing 102.

The distributed trailing edge wing flap system 300 of FIG. 3 also includes a first example FCEU 366, a second example FCEU 368, and an example flap lever 370. In some examples, the first FCEU 366 and the second FCEU 368 of FIG. 3 can be located within a fuselage of an aircraft (e.g., the fuselage 106 of the aircraft 100 of FIG. 1), and the flap lever 370 of FIG. 3 can be located in a cockpit area of the aircraft (e.g., the cockpit area 108 of the aircraft 100 of FIG. 1). The first FCEU 366 and the second FCEU 368 of FIG. 3 are respectively controlled and/or operated based on one or more input(s) received from the flap lever 370 of FIG. 3. In some examples, the position of the flap lever 370 can correspond to and/or otherwise be associated with a desired and/or commanded position and/or detent (e.g., flaps retracted, flaps thirty (F30), flaps forty (F40), etc.) of the first inboard flap 112, the first outboard flap 114, the second inboard flap 118, and/or the second outboard flap 120.

In the illustrated example of FIG. 3, the first FCEU 366 is operatively coupled to (e.g., in electrical communication with) respective ones of the first and second REUs 336, 338 via a first example databus 372. The first FCEU 366 can transmit and/or receive data (e.g., REU control data, hydraulic module control data, actuator position feedback sensor data, etc.) to and/from respective ones of the first and second REUs 336, 338 via the first databus 372. The first FCEU 366 is also operatively coupled to (e.g., in electrical communication with) respective ones of the first, second, fifth and sixth flap position sensors 350, 352, 358, 360. The first FCEU 366 can receive data (e.g., flap position sensor data) from respective ones of the first, second, fifth and sixth flap position sensors 350, 352, 358, 360.

The second FCEU 368 is operatively coupled to (e.g., in electrical communication with) respective ones of the first, second, third and fourth EMCUs 340, 342, 344, 346 via a second example databus 374. The second FCEU 368 can transmit and/or receive data (e.g., EMCU control data, electric motor control data, actuator position feedback sensor data, etc.) to and/from respective ones of the first, second, third and fourth EMCUs 340, 342, 344, 346 via the second databus 374. The second FCEU 368 is also operatively coupled to (e.g., in electrical communication with) respective ones of the third, fourth, seventh and eighth flap position sensors 354, 356, 362, 364. The second FCEU 368 can receive data (e.g., flap position sensor data) from respective ones of the third, fourth, seventh and eighth flap position sensors 354, 356, 362, 364.

In the illustrated example of FIG. 3, the second FCEU 368 controls respective ones of the first, second, third and fourth switches of corresponding respective ones of the first, second, third and fourth EMCUs 340, 342, 344, 346 to selectively connect the electrical system 348 of FIG. 3 to respective ones of the first, second, third and fourth electric motors of the corresponding respective ones of the first, second, third and fourth EMAs 310, 312, 314, 316. In some examples, the second FCEU 368 can actuate the first, second, third and/or fourth switch(es) of corresponding ones of the first, second, third and/or fourth EMCU(s) 340, 342, 344, 346 to a closed position following and/or in response to a failure (e.g., loss or reduction of pressurized hydraulic fluid) of the hydraulic system 330 of FIG. 3. In response to the second FCEU 368 actuating the first, second, third and/or fourth switch(es) of the corresponding ones of the first, second, third and/or fourth EMCU(s) 340, 342, 344, 346 to the closed position, the first, second, third and/or fourth electric motor(s) of the corresponding ones of the first, second, third and/or fourth EMA(s) 310, 312, 314, 316 is/are activated.

Activation of the first, second, third and/or fourth electric motor(s) of the corresponding ones of the first, second, third and fourth EMA(s) 310, 312, 314, 316 causes the first, second, third and/or fourth EMA(s) 310, 312, 314, 316 to control rotation of corresponding ones of the first, second, third and/or fourth shaft(s) 318, 320, 322, 324 of FIG. 3. Rotation of the first, second, third and/or fourth shaft(s) 318, 320, 322, 324 via the corresponding ones of the first, second, third and/or fourth EMA(s) 310, 312, 314, 316 moves and/or actuates corresponding ones of the first, second, third and/or fourth HMA(s) 302, 304, 306, 308 of FIG. 3, thereby moving and/or actuating corresponding ones of the first inboard flap 112, the first outboard flap 114, the second inboard flap 118, and/or the second outboard flap 120 to a predetermined position (e.g., flaps thirty (F30), flaps forty (F40), etc.).

Figure 4:
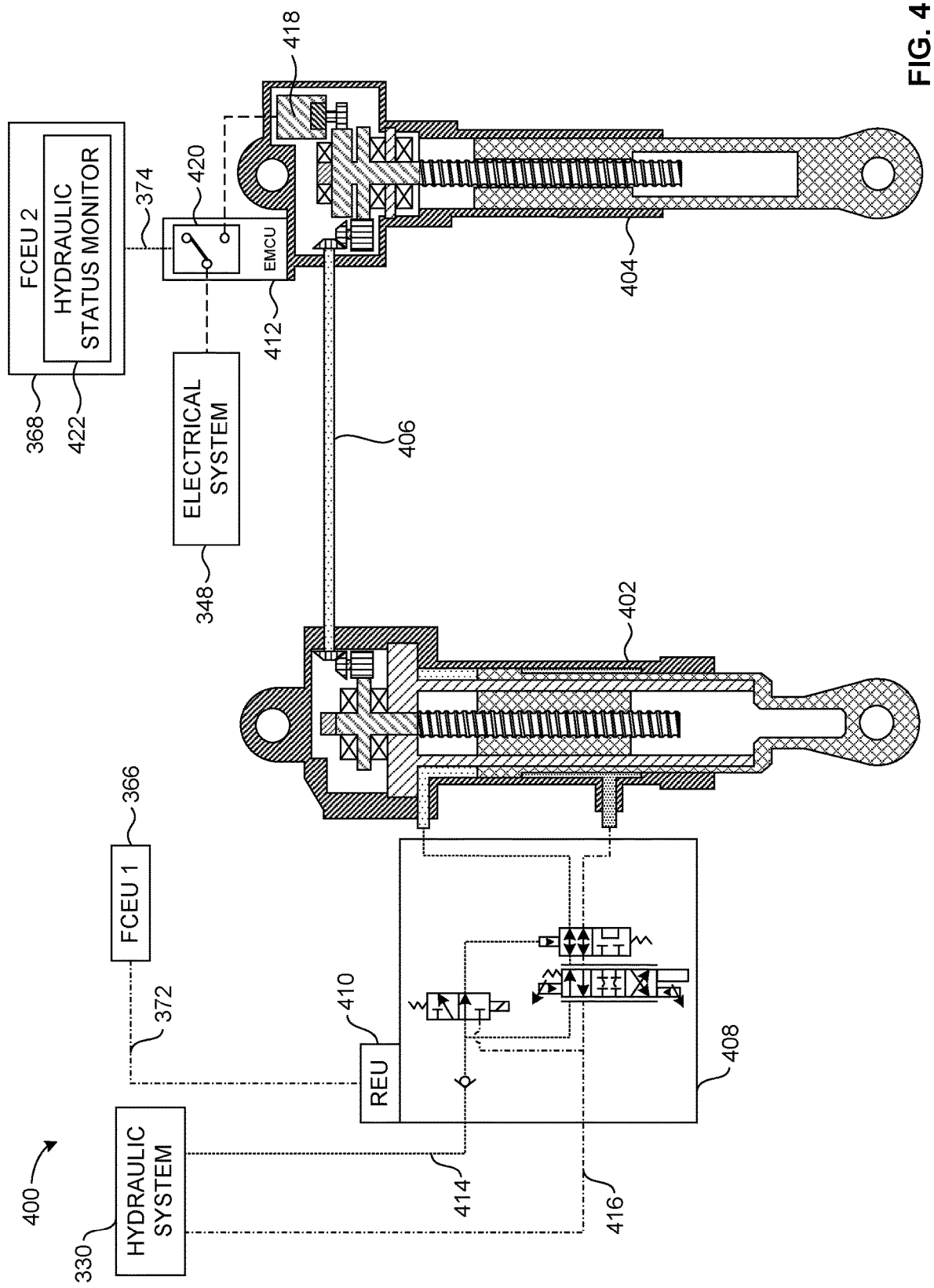
FIG. 4 is a schematic of an example subsystem of the example distributed trailing edge wing flap system of FIG. 3.

FIG. 4 is a schematic of an example subsystem 400 of the example distributed trailing edge wing flap system 300 of FIG. 3. The subsystem 400 of FIG. 4 includes the hydraulic system 330, the electrical system 348, the first FCEU 366, the second FCEU 368, the first databus 372, and the second databus 374 of FIG. 3 described above. The subsystem 400 of FIG. 4 further includes an example HMA 402, an example EMA 404, an example shaft 406, an example hydraulic module 408, an example REU 410, and an example EMCU 412. The subsystem 400 of FIG. 4 is representative of the structures and operative couplings associated with any one of the first inboard flap 112, the first outboard flap 114, the second inboard flap 118, or the second outboard flap 120 of FIG. 3 described above.

For example, the HMA 402, the EMA 404, the shaft 406, the hydraulic module 408, the REU 410, and the EMCU 412 of FIG. 4 can correspond, respectively, to the first HMA 302, the first EMA 310, the first shaft 318, the first hydraulic module 326, the first REU 336, and the first EMCU 340 of FIG. 3 associated with the first inboard flap 112 of FIG. 3. As another example, the HMA 402, the EMA 404, the shaft 406, the hydraulic module 408, the REU 410, and the EMCU 412 of FIG. 4 can correspond, respectively, to the second HMA 304, the second EMA 312, the second shaft 320, the first hydraulic module 326, the first REU 336, and the second EMCU 342 of FIG. 3 associated with the first outboard flap 114 of FIG. 3. As another example, the HMA 402, the EMA 404, the shaft 406, the hydraulic module 408, the REU 410, and the EMCU 412 of FIG. 4 can correspond, respectively, to the third HMA 306, the third EMA 314, the third shaft 322, the second hydraulic module 328, the second REU 338, and the third EMCU 344 of FIG. 3 associated with the second inboard flap 118 of FIG. 3. As another example, the HMA 402, the EMA 404, the shaft 406, the hydraulic module 408, the REU 410, and the EMCU 412 of FIG. 4 can correspond, respectively, to the fourth HMA 308, the fourth EMA 316, the fourth shaft 324, the second hydraulic module 328, the second REU 338, and the fourth EMCU 346 of FIG. 3 associated with the second outboard flap 120 of FIG. 3.

In the illustrated example of FIG. 4, the shaft 406 operatively couples (e.g., mechanically couples) the HMA 402 to the EMA 404 such that motion and/or movement of the HMA 402 is transferred via the shaft 406 to the EMA 404, and vice-versa. The hydraulic module 408 of FIG. 4 is operatively coupled to (e.g., in fluid communication with) the HMA 402. The REU 410 of FIG. 4 is located at, and is operatively coupled to (e.g., in electrical communication with), the hydraulic module 408. The hydraulic system 330 of FIG. 4 is operatively coupled to (e.g., in fluid communication with) the hydraulic module 408 via an example supply line 414 and an example return line 416. The EMCU 412 of FIG. 4 is located at, and is operatively coupled to (e.g., in electrical communication with), the EMA 404 and/or an example electric motor 418 of the EMA 404. The EMCU 412 of FIG. 4 includes an example switch 420. The electrical system 348 of FIG. 4 is selectively operatively connectable to (e.g., in selective electrical communication with) the electric motor 418 of the EMA 404 via the switch 420 of the EMCU 412. The first FCEU 366 of FIG. 4 is operatively coupled to (e.g., in electrical communication with) the REU 410 via the first databus 372. The second FCEU 368 of FIG. 4 is operatively coupled to (e.g., in electrical communication with) the switch 420 and/or, more generally, the EMCU 412. The second FCEU 368 includes an example hydraulic status monitor 422 to monitor the status (e.g., for loss or reduction of pressurized hydraulic fluid) of the hydraulic system 330. FIGS. 5-8 illustrate the HMA 402, the EMA 404, the shaft 406, the hydraulic module 408, and the EMCU 412 of FIG. 4 in greater detail.

Figure 5:
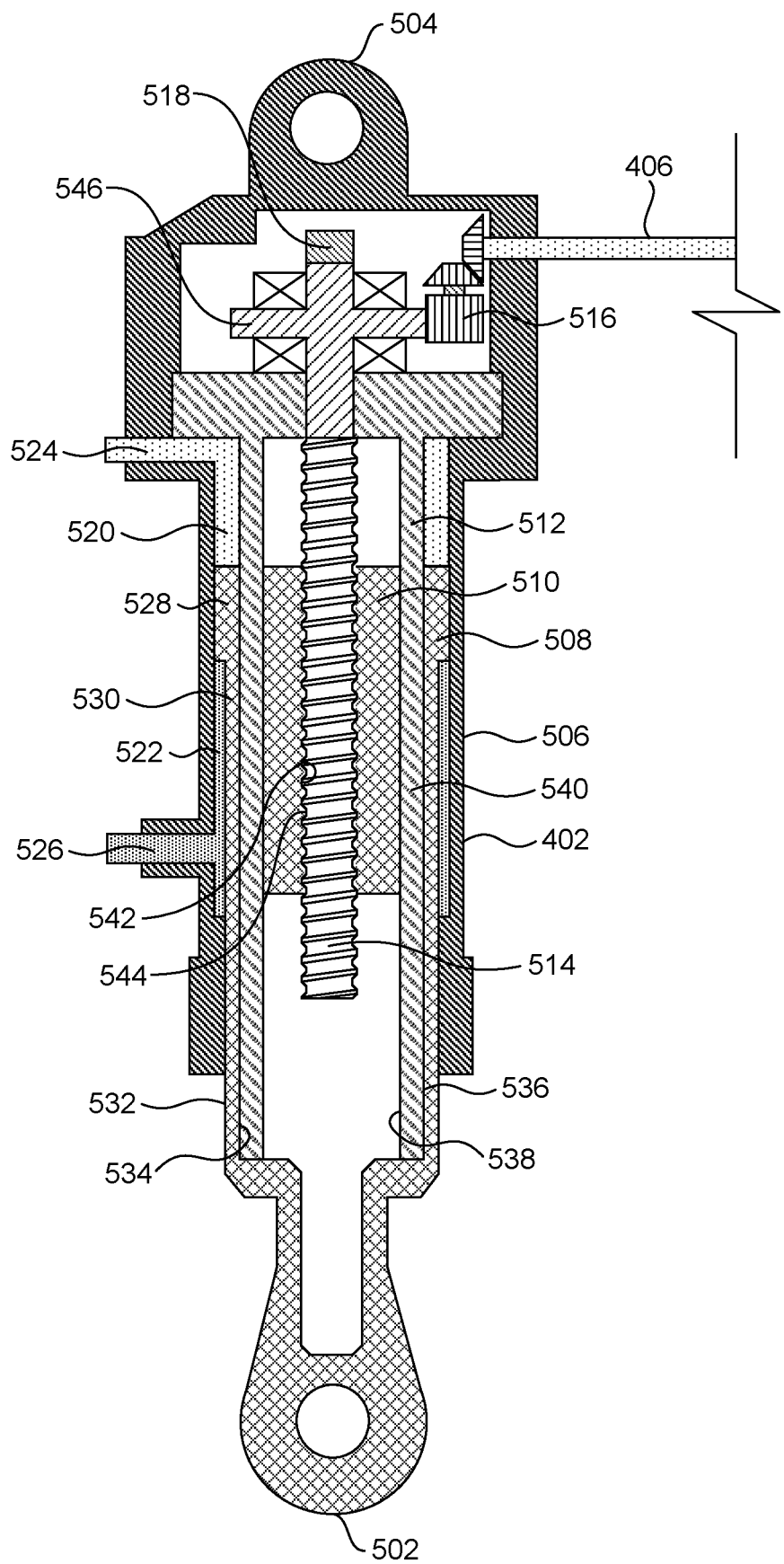
FIG. 5 is a schematic of the example hydromechanical actuator of FIG. 4.

FIG. 5 is a schematic of the example HMA 402 of FIG. 4. In the illustrated example of FIG. 5, the HMA 402 includes an example first end 502, an example second end 504 located opposite the first end 502, an example cylinder 506, an example piston 508, an example ball nut 510, an example case 512, an example ball screw 514, an example gearset 516, an example actuator position feedback sensor 518, an example first fluid volume 520, an example second fluid volume 522, an example first port 524, and an example second port 526. The first end 502 of the HMA 402 can be coupled to a linkage assembly (e.g., the first linkage assembly 206 of FIGS. 2A-2C) of a wing flap (e.g., the first inboard flap 112, the first outboard flap 114, the second inboard flap 118, or the second outboard flap 120 of FIGS. 1 and 3), and the second end 504 of the HMA 402 can be coupled to a corresponding wing (e.g., the first wing 102 or the second wing 104 of FIGS. 1 and 3). The cylinder 506, the piston 508, the ball nut 510, the case 512, and the ball screw 514 of the HMA 402 have respective fixed lengths. The piston 508 is positioned, disposed, and/or received within the cylinder 506 and is movable and/or slidable relative to the cylinder 506 between a retracted position and an extended position. In some examples, the HMA 402 of FIG. 5 has a first length when the piston 508 is in the retracted position relative to the cylinder 506, and a second length greater than the first length when the piston 508 is in the extended position relative to the cylinder 506.

In the illustrated example of FIG. 5, the piston 508 and the ball nut 510 of FIG. 5 are coupled to one another and/or integrally formed such that the piston 508 and the ball nut 510 move together as a unit relative to the cylinder 506. The piston 508 of FIG. 5 includes an example head 528 and an example rod 530. The rod 530 includes an example outer surface 532 and an example inner surface 534. The case 512 of FIG. 5 includes an example outer surface 536, an example inner surface 538, and an example slotted portion 540 extending between the inner and outer surfaces 538, 536 of the case 512. The outer surface 536 of the case 512 extends along the inner surface 534 of the rod 530 of the piston 508. The slotted portion 540 of the case 512 receives the coupled and/or integrated piston 508 and ball nut 510. The slotted portion 540 of the case 512 enables translation (e.g., linear motion) of the coupled and/or integrated piston 508 and ball nut 510 relative to the cylinder 506, while also preventing rotation of the coupled and/or integrated piston 508 and ball nut 510 relative to the cylinder 506.

The head 528 of piston 508 is located and/or positioned within the cylinder 506 between the first fluid volume 520 and the second fluid volume 522. The first fluid volume 520 includes and/or is a first volume of pressurized hydraulic fluid. In the illustrated example of FIG. 5, the first fluid volume 520 is in fluid communication with the first port 524 of the HMA 402, and is bounded by the cylinder 506, the head 528 of the piston 508, and the outer surface 536 of the case 512. The second fluid volume 522 includes and/or is a second volume of pressurized hydraulic fluid that is isolated from the first volume of pressurized hydraulic fluid. In the illustrated example of FIG. 5, the second fluid volume 522 is in fluid communication with the second port 526 of the HMA 402, and is bounded by the cylinder 506, the head 528 of the piston 508, and the outer surface 532 of the rod 530 of the piston 508. In some examples, one or more seal(s) can be coupled to and/or disposed on the head 528 of the piston 508, on the outer surface 532 of the rod 530 of the piston 508, and/or on the outer surface 536 of the case 512. In such examples, the seal(s) can provide one or more interface(s) between the cylinder 506, the piston 508, and/or the case 512 to isolate the first fluid volume 520 from the second fluid volume 522.

Increasing the first fluid volume 520 of FIG. 5 (e.g., increasing the volume of the pressurized hydraulic fluid of the first fluid volume 520) causes the piston 508 of FIG. 5 to move and/or slide relative to the cylinder 506 of FIG. 5 away from a retracted position and toward an extended position. A wing flap coupled via a linkage assembly to the first end 502 of the HMA 402 can move away from a retracted position and toward a deployed position in response to the piston 508 moving away from the retracted position and toward the extended position. In the illustrated example of FIG. 5, the first fluid volume 520 has a minimum volume when the piston 508 is in the retracted position, and has a maximum volume when the piston 508 is in the extended position.

Increasing the second fluid volume 522 of FIG. 5 (e.g., increasing the volume of the pressurized hydraulic fluid of the second fluid volume 522) causes the piston 508 of FIG. 5 to move and/or slide relative to the cylinder 506 of FIG. 5 away from an extended position and toward a retracted position. A wing flap coupled via a linkage assembly to the first end 502 of the HMA 402 can move away from a deployed position and toward a retracted position in response to the piston 508 moving away from the extended position and toward the retracted position. In the illustrated example of FIG. 5, the second fluid volume 522 has a minimum volume when the piston 508 is in the extended position, and has a maximum volume when the piston 508 is in the retracted position.

As described above, the ball nut 510 is coupled to and/or integrally formed with the piston 508 such that the piston 508 and the ball nut 510 move and/or slide together as a unit relative to the cylinder 506. In the illustrated example of FIG. 5, the ball nut 510 includes an example threaded portion 542. The ball screw 514 includes an example threaded portion 544 configured to engage the threaded portion 542 of the ball nut 510. The ball nut 510 is prevented from rotating relative to the cylinder 506 as a result of the coupled and/or integrally formed piston 508 and ball nut 510 being positioned within the slotted portion 540 of the case 512. Accordingly, translation (e.g., linear movement) of the piston 508 and the ball nut 510 (e.g., as can occur in response to a change in the first fluid volume 520 and/or the second fluid volume 522, as described above) causes rotation of the ball screw 514. Conversely, rotation of the ball screw 514 (as can occur in response to rotation of the shaft 406 of FIGS. 4 and 5, as further described below) causes translation of the ball nut 510 and the piston 508. Balls that function with the ball nut 510 and the ball screw 514 are omitted from FIGS. 4 and 5 in the interest of clarity of the figures.

In the illustrated example of FIG. 5, the ball screw 514 includes an example gear 546. The gear 546 can be coupled to and/or integrally formed with the ball screw 514. The gear 546 of the ball screw 514 engages the gearset 516 of the HMA 402, and the gearset 516 of the HMA 402 in turn engages the shaft 406. The gearset 516 of FIG. 5 can include any number of gears to transfer rotational motion from the gear 546 of the ball screw 514 to the shaft 406. In the illustrated example of FIG. 5, translation of the piston 508 and the ball nut 510 relative to the cylinder 506 causes rotation of the ball screw 514, which in turn causes rotation of the gear 546, which in turn causes rotation of the gearset 516, which in turn causes rotation of the shaft 406. Conversely, rotation of the shaft 406 causes rotation of the gearset 516, which in turn causes rotation of the gear 546, which in turn causes rotation of the ball screw 514, which in turn causes translation of the ball nut 510 and the piston 508 relative to the cylinder 506.

In the illustrated example of FIG. 5, the actuator position feedback sensor 518 is coupled to and/or mounted on the ball screw 514. The actuator position feedback sensor 518 senses, measures and/or detects a position of the ball screw 514 (e.g., a rotational position of the ball screw 514 relative to the cylinder 506), and/or a position of the piston 508 (e.g., a translational position of the piston 508 relative to the cylinder 506). The actuator position feedback sensor 518 of FIG. 5 is operatively coupled to (e.g., in electrical communication with) the REU 410 of FIG. 4 such that the REU 410 can receive and/or obtain actuator position feedback data sensed, measured and/or detected via the actuator position feedback sensor 518. Actuator position feedback data obtained by the REU 410 of FIG. 4 can be conveyed to the first FCEU 366 of FIG. 4 via the databus 372 of FIG. 4. In the illustrated example of FIGS. 4 and 5, the above-described electrical signals and/or connections between the REU 410 and the actuator position feedback sensor 518 of the HMA 402 are omitted in the interest of clarity of the figures.

The HMA 402 of FIGS. 4 and 5 can be actuated by either of two independent mechanisms. First, the HMA 402 can be actuated via the hydraulic system 330 and the hydraulic module 408 when the hydraulic system 330 and the hydraulic module 408 are operational, functional, and/or active. Second, in the event of a failure of the hydraulic system 330 or the hydraulic module 408, the HMA 402 can alternatively be actuated via the shaft 406 under the control of the EMA 404 of FIGS. 4 and 8.

Figure 6:
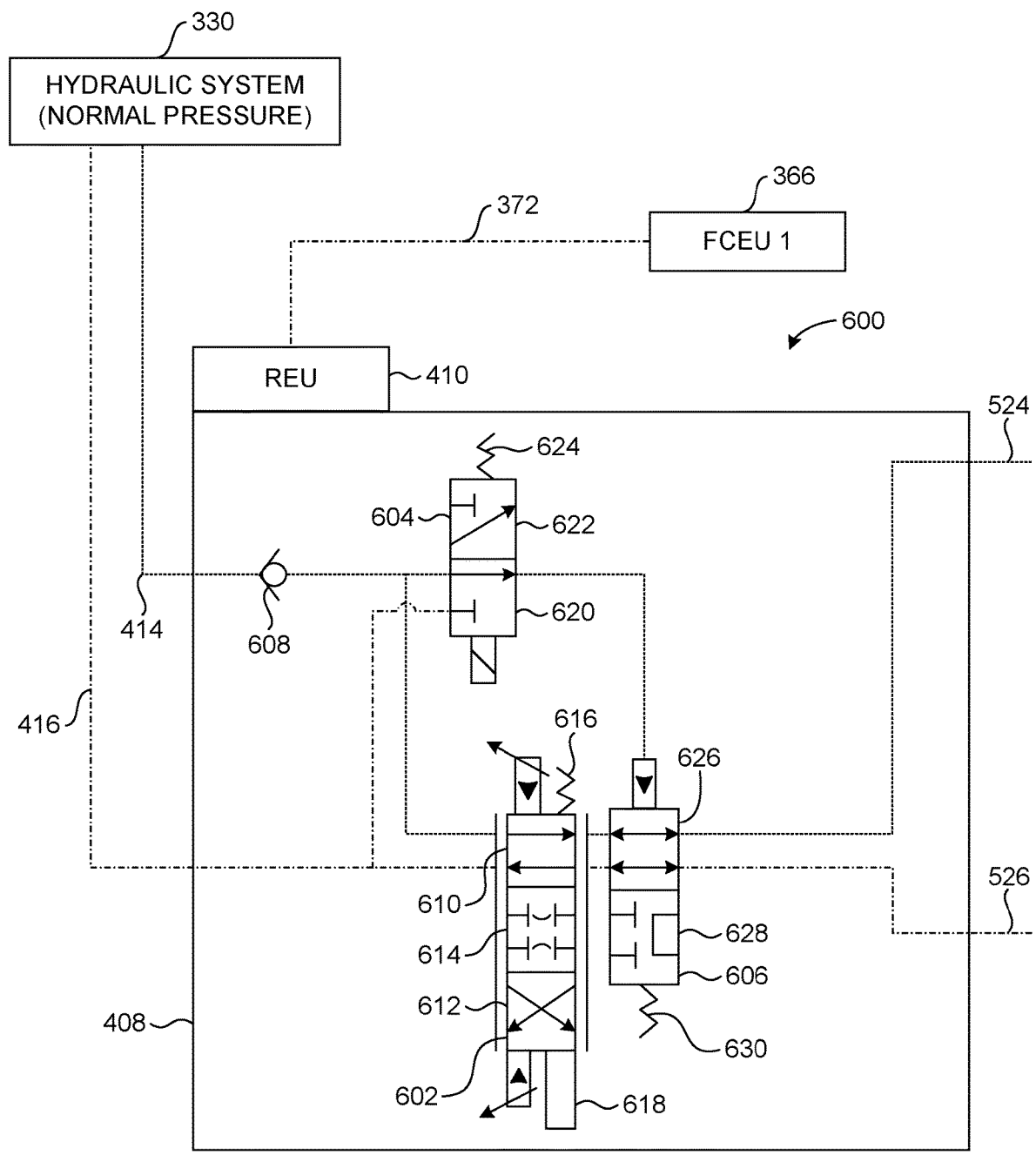
FIG. 6 is a schematic of the example hydraulic module of FIG. 4 in a first example operational mode.
Figure 7:
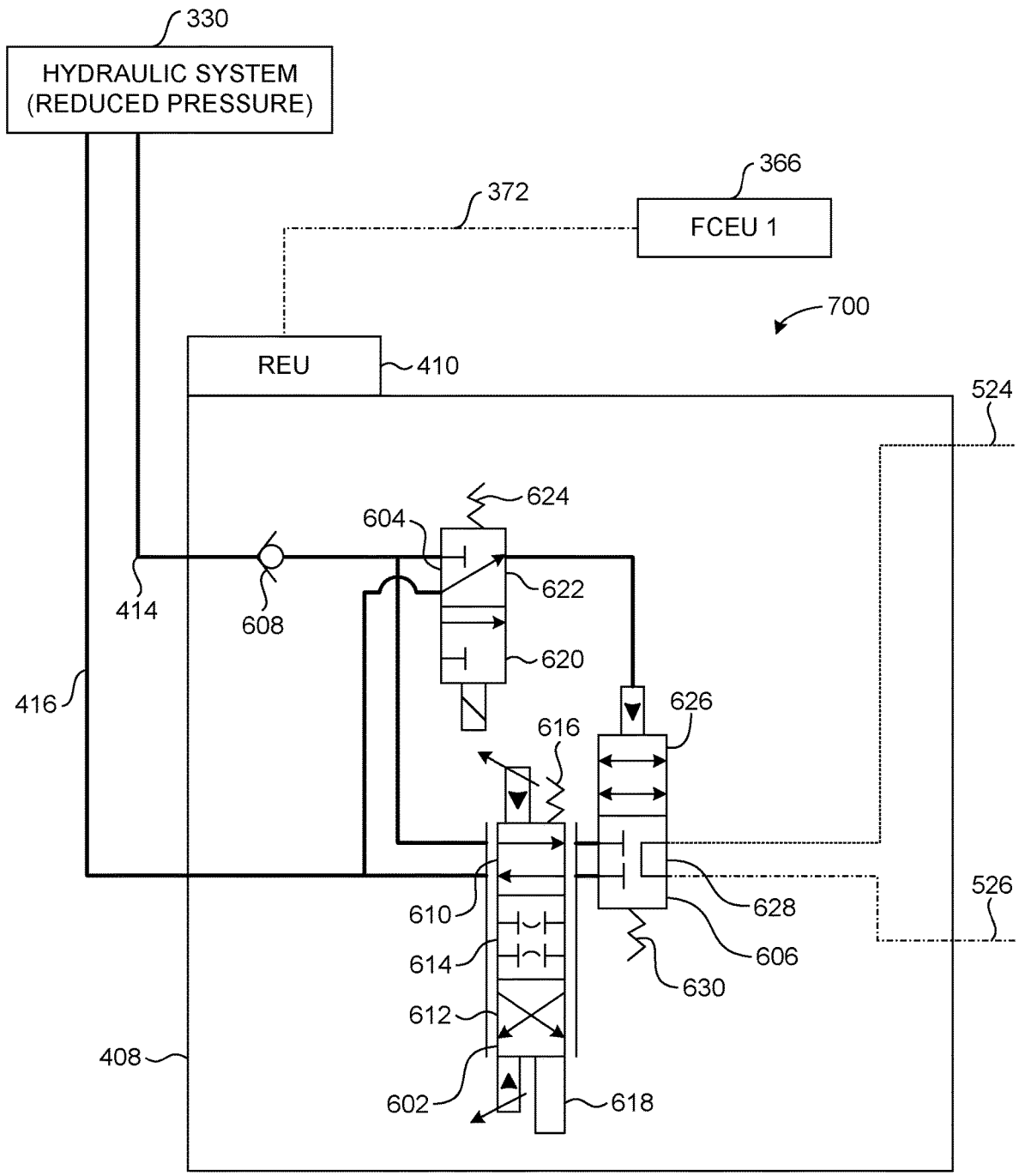
FIG. 7 is a schematic of the example hydraulic module of FIG. 4 in a second example operational mode.

FIG. 6 is a schematic of the example hydraulic module 408 of FIG. 4 in a first example operational mode 600. FIG. 7 is a schematic of the example hydraulic module 408 of FIG. 4 in a second example operational mode 700. The hydraulic module 408 of FIGS. 4, 6 and 7 can selectively place the supply line 414 of the hydraulic system 330 in fluid communication with either the first port 524 or the second port 526 of the HMA 402 to selectively provide pressurized hydraulic fluid to the first fluid volume 520 or the second fluid volume 522 of the HMA 402. The hydraulic module 408 of FIGS. 4, 6 and 7 can also selectively place the return line 416 in fluid communication with either the first port 524 or the second port 526 of the HMA 402 to selectively receive pressurized hydraulic fluid from the first fluid volume 520 or the second fluid volume 522 of the HMA 402. The REU 410 of FIGS. 4, 6 and 7 includes one or more processor(s) to control and/or manage loop closure, failure detection, and/or actuation control commands associated with the hydraulic module 408.

The hydraulic module 408 of FIGS. 4, 6 and 7 includes a plurality of control valves. In some examples, one or more of the control valves can be hydraulically actuated (e.g., via pressurized hydraulic fluid supplied via the supply line 414). In some examples, one or more of the control valves can be electrically actuated (e.g., via the REU 410). The control valves of the hydraulic module 408 control and/or manage the routing and/or distribution of pressurized hydraulic fluid from the supply line 414 to the ports of the HMA 402 (e.g., the first and second ports 524, 526 of FIG. 5 described above), and from the ports of the HMA 402 to the return line 416. In the illustrated examples of FIGS. 6 and 7, the hydraulic module 408 includes an example electrohydraulic servo valve (EHSV) 602, an example solenoid valve (SOV) 604, an example mode selector valve (MSV) 606, and an example check valve 608.

The EHSV 602 of FIGS. 6 and 7 is a four-way flow-control valve which produces flow as a function of input current. The EHSV 602 has three control ports that are movable and/or actuatable between an example first control port position 610 (e.g., a flap deployment flow position), an example second control port position 612 (e.g., a flap retraction flow position), and an example third control port position 614 (e.g., a null region). The EHSV 602 includes and/or is coupled to an example first bias spring 616 and an example LVDT 618. The first bias spring 616 biases the EHSV 602 into and/or toward the first control port position 610 of the EHSV 602. The LVDT 618 senses, measures and/or detects a position of the EHSV 602. In the illustrated examples of FIGS. 6 and 7, the EHSV 602 is operatively coupled to (e.g., in electrical communication with) the REU 410. The REU 410 selectively positions the EHSV 602 in one of the first, second, or third control port positions 610, 612, 614 of the EHSV 602. For example, the REU 410 can energize the EHSV 602 to move from the first control port position 610 into the second control port position 612 over the bias generated by the first bias spring 616. In some examples, the REU 410 transmits a control signal to the EHSV 602 to control the position of the EHSV 602. The REU 410 also receives an electrical signal from an actuator position feedback sensor of the HMA 402 (e.g., the actuator position feedback sensor 518 of the HMA 402) associated with the REU 410 and the hydraulic module 408. In the illustrated example of FIGS. 4, 6 and 7, the above-described electrical signals and/or connections between the REU 410 and the EHSV 602 of the hydraulic module 408 are omitted in the interest of clarity of the figures. In some examples, a dispatch requirement of the aircraft results in a higher availability requirement for the distributed trailing edge wing flap system and, as such, a single electrical channel in the SOV 604, EHSV 602, and actuator position feedback sensor is increased to dual electrical channels whereby one electrical channel interfaces with one REU and the other electrical channel interfaces with a different REU.

The SOV 604 of FIGS. 6 and 7 is a two-position valve having control ports that are movable and/or actuatable between an example first control port position 620 (e.g., a normal flow position) and an example second control port position 622 (e.g., a diverted flow position). The SOV 604 includes and/or is coupled to an example second bias spring 624. The second bias spring 624 biases the SOV 604 into and/or toward the second control port position 622 of the SOV 604. In the illustrated examples of FIGS. 6 and 7, the SOV 604 is operatively coupled to (e.g., in electrical communication with) the REU 410. The REU 410 selectively positions the SOV 604 in one of the first or second control port positions 620, 622 of the SOV 604. For example, the REU 410 can energize and/or electrically command the SOV 604 to move from the second control port position 622 into the first control port position 620 over the bias generated by the second bias spring 624. In some examples, the REU 410 can de-energize the SOV 604 in response to detecting and/or determining that a difference between an electrical signal from the LVDT 618 of the EHSV 602 and a calculated position of the EHSV 602 exceeds a threshold (e.g., a predetermined threshold), as can occur in the case of a run-away and/or improperly functioning actuator. In the illustrated example of FIGS. 4, 6 and 7, the above-described electrical signals and/or connections between the REU 410 and the SOV 604 of the hydraulic module 408 are omitted in the interest of clarity of the figures.

The MSV 606 of FIGS. 6 and 7 is a two-position valve having control ports that are movable and/or actuatable between an example first control port position 626 (e.g., an active flow position) and an example second control port position 628 (e.g., a bypassed flow position). The MSV 606 includes and/or is coupled to an example third bias spring 630. The third bias spring 630 biases the MSV 606 into and/or toward the second control port position 628 of the MSV 606. In the illustrated examples of FIGS. 6 and 7, the MSV 606 is operatively coupled to (e.g., in fluid communication with) the SOV 604. The SOV 604 selectively positions the MSV 606 in one of the first or second control port positions 626, 628 of the MSV 606. For example, the SOV 604 can supply pressurized hydraulic fluid to the MSV 606 to move the MSV 606 from the second control port position 628 into the first control port position 626 over the bias generated by the third bias spring 630.

When the MSV 606 of FIGS. 6 and 7 is positioned in the second control port position 628 (e.g., the bypassed flow position), pressurized hydraulic fluid contained within the first fluid volume 520 of the HMA 402 freely passes from the first fluid volume 520 through the first port 524 of the HMA 402, through the MSV 606 of the hydraulic module 408, through the second port 526 of the HMA 402, and into the second fluid volume 522 of the HMA 402. Pressurized hydraulic fluid contained within the second fluid volume 522 of the HMA 402 also freely passes from the second fluid volume 522 through the second port 526 of the HMA 402, through the MSV 606 of the hydraulic module 408, through the first port 524 of the HMA 402, and into the first fluid volume 520 of the HMA 402. The unrestricted exchange and/or bypass of pressurized hydraulic fluid between the first fluid volume 520 and the second fluid volume 522 of the HMA 402 enables the piston 508 of the HMA 402 to be freely movable. The position of the piston 508 and/or the position of a wing flap to which the piston 508 is coupled is/are accordingly freely movable when the MSV 606 of the hydraulic module 408 is in the second control port position 628 (e.g., the bypassed flow position).

The check valve 608 of FIGS. 6 and 7 blocks pressurized hydraulic fluid that has passed from the supply line 414 of the hydraulic system 330 through the check valve 608 in a first direction from returning through the check valve 608 in a second direction opposite the first direction to the supply line 414 of the hydraulic system 330.

The first operational mode 600 of FIG. 6 corresponds to an active mode of operation of the hydraulic module 408 of FIG. 4, in which the hydraulic system 330 of FIG. 4 is operating according to normal and/or intended conditions. When the hydraulic module 408 is in the first operational mode 600 of FIG. 6, pressurized hydraulic fluid (e.g., pressurized hydraulic fluid generated by the hydraulic system 330) is supplied from the hydraulic system 330 to the hydraulic module 408 via the supply line 414. The SOV 604 of the hydraulic module 408 is energized (e.g., ON). The EHSV 602 is in the first control port position 610 of the EHSV 602, the SOV 604 is in the first control port position 620 of the SOV 604, and the MSV 606 is in the first control port position 626 (e.g., the active flow position) of the MSV 606. In other examples, the EHSV 602 can be in the second control port position 612 of the EHSV 602 when the hydraulic module 408 is in the first operational mode 600 of FIG. 6. The HMA 402 of FIG. 4 is in an active mode when the hydraulic module 408 of FIG. 4 is in the first operational mode 600 of FIG. 6.

The second operational mode 700 of FIG. 7 corresponds to a bypassed mode of operation of the hydraulic module 408 of FIG. 4, in which the hydraulic system 330 of FIG. 4 is not operating according to normal and/or intended conditions (e.g., due to a partial or complete loss of pressure associated with the hydraulic system 330). When the hydraulic module 408 is in the second operational mode 700 of FIG. 7, pressurized hydraulic fluid (e.g., pressurized hydraulic fluid generated by the hydraulic system 330) is either not supplied, or is supplied at a reduced pressure, from the hydraulic system 330 to the hydraulic module 408 via the supply line 414. The SOV 604 of the hydraulic module 408 is deenergized (e.g., OFF). The EHSV 602 is in the first control port position 610 of the EHSV 602, the SOV 604 is in the second control port position 622 of the SOV 604, and the MSV 606 is in the second control port position 628 (e.g., the bypassed flow position) of the MSV 606. In other examples, the EHSV 602 can be in the second control port position 612 of the EHSV 602 when the hydraulic module 408 is in the second operational mode 700 of FIG. 7. The HMA 402 of FIG. 4 is in a bypassed mode when the hydraulic module 408 of FIG. 4 is in the second operational mode 700 of FIG. 7.

Figure 8:
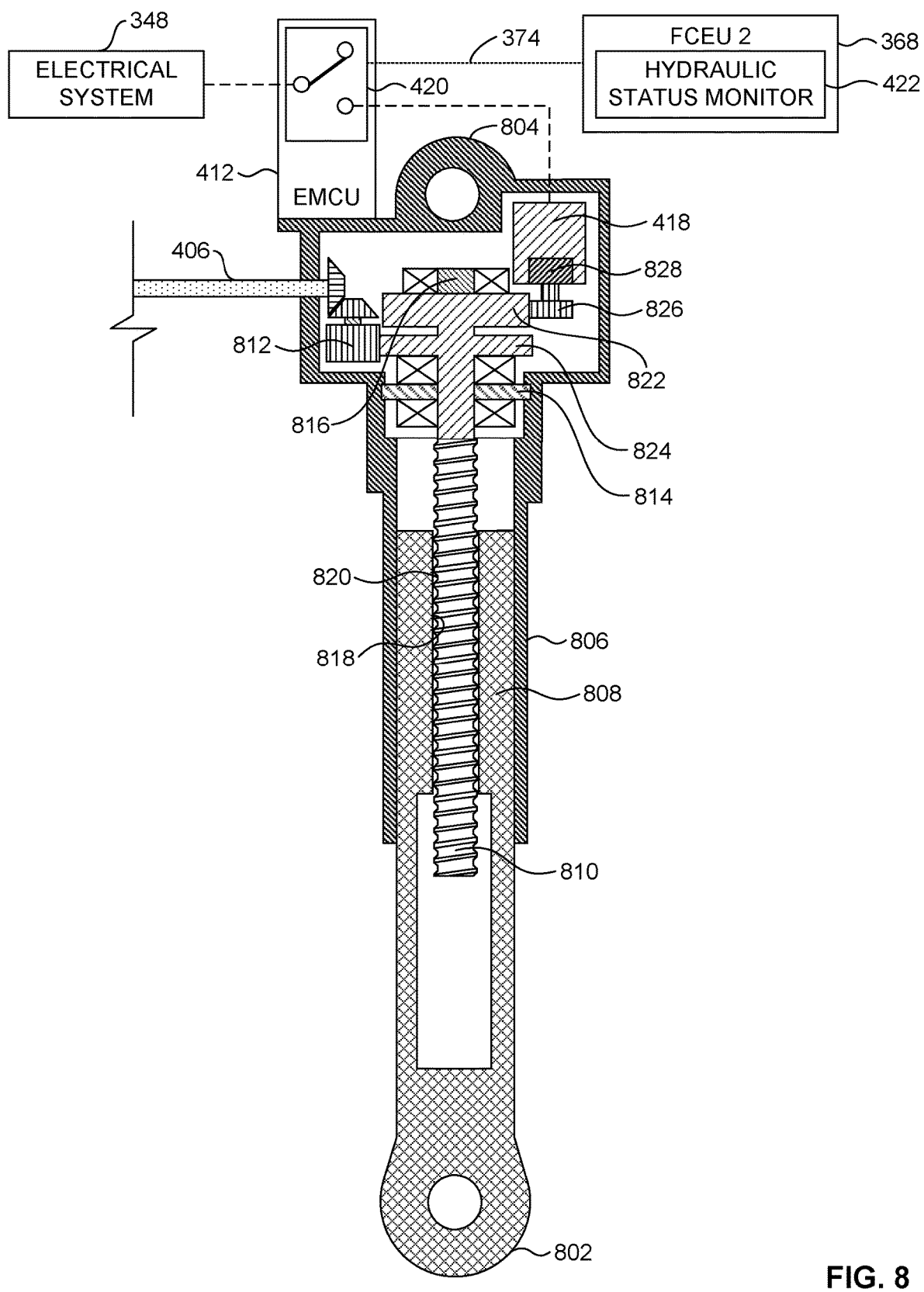
FIG. 8 is a schematic of the example electromechanical actuator of FIG. 4.

FIG. 8 is a schematic of the example EMA 404 of FIG. 4. In the illustrated example of FIG. 8, the EMA 404 includes the electric motor 418 of FIG. 4, and further includes an example first end 802, an example second end 804 located opposite the first end 802, an example case 806, an example ball nut 808, an example ball screw 810, an example gearset 812, an example no-back device 814, and an example actuator position feedback sensor 816. The first end 802 of the EMA 404 can be coupled to a linkage assembly (e.g., the second linkage assembly 208 of FIGS. 2A, 2D and 2E) of a wing flap (e.g., the first inboard flap 112, the first outboard flap 114, the second inboard flap 118, or the second outboard flap 120 of FIGS. 1 and 3), and the second end 804 of the EMA 404 can be coupled to a corresponding wing (e.g., the first wing 102 or the second wing 104 of FIGS. 1 and 3). The case 806, the ball nut 808, and the ball screw 810 of the EMA 404 have respective fixed lengths. The ball nut 808 is configured to receive the ball screw 810. The ball nut 808 is positioned, disposed, and/or received within the case 806 and is movable and/or slidable, but not rotatable, relative to the case 806 between a retracted position and an extended position. In some examples, the EMA 404 of FIG. 8 has a first length when the ball nut 808 is in the retracted position relative to the case 806, and a second length greater than the first length when the ball nut 808 is in the extended position relative to the case 806.

In the illustrated example of FIG. 8, the ball nut 808 includes an example threaded portion 818. The ball screw 810 includes an example threaded portion 820 configured to engage the threaded portion 818 of the ball nut 808. Movement (e.g., rotation) of the ball screw 810 of the EMA 404 in a first rotational direction causes movement (e.g., translation) of the ball nut 808 of the EMA 404 relative to the case 806 of the EMA 404 in a first translational direction. For example, rotating the ball screw 810 of FIG. 8 in a clockwise direction can cause the ball nut 808 of FIG. 8 to move and/or slide relative to the case 806 of FIG. 8 away from a retracted position and toward an extended position. A wing flap coupled via a linkage assembly to the first end 802 of the EMA 404 can move away from a retracted position and toward a deployed position in response to the ball nut 808 moving away from the retracted position and toward the extended position.

Conversely, movement (e.g., rotation) of the ball screw 810 of the EMA 404 in a second rotational direction opposite the first rotational direction causes movement (e.g., translation) of the ball nut 808 of the EMA 404 relative to the case 806 of the EMA 404 in a second translational direction opposite the first translational direction. For example, rotating the ball screw 810 of FIG. 8 in a counter-clockwise direction can cause the ball nut 808 of FIG. 8 to move and/or slide relative to the case 806 of FIG. 8 away from an extended position and toward a retracted position. A wing flap coupled via a linkage assembly to the first end 802 of the EMA 404 can move away from a deployed position and toward a retracted position in response to the ball nut 808 moving away from the extended position and toward the retracted position. Balls that function with the ball nut 808 and the ball screw 810 are omitted from FIGS. 4 and 8 in the interest of clarity of the figures.

The no-back device 814 of FIG. 8 is operatively coupled to the ball screw 810 of the EMA 404. The no-back device 814 is a passive braking device structured to enable only the EMA 404 to provide an actuation power flow. The no-back device 814 brakes and/or locks the ball screw 810 of the EMA 404 against any induced rotation by reason of an axial loading (e.g., tension or compression) on the ball nut 808 of the EMA 404, as can occur in response to a failure (e.g., loss or reduction of pressurized hydraulic fluid) of the hydraulic system 330.

In the illustrated example of FIG. 8, the ball screw 810 further includes an example first gear 822 and an example second gear 824. The first gear 822 of the ball screw 810 can be coupled to and/or integrally formed with the ball screw 810. The second gear 824 of the ball screw 810 can also be coupled to and/or integrally formed with the ball screw 810. In the illustrated example of FIG. 8, the second gear 824 of the ball screw 810 is spaced apart from the first gear 822 of the ball screw 810 along the longitudinal axis of the ball screw 810. The first gear 822 of the ball screw 810 engages an example output gear 826 associated with the electric motor 418 of the EMA 404. The second gear 824 of the ball screw 810 engages the gearset 812 of the EMA 404, and the gearset 812 of the EMA 404 in turn engages the shaft 406. The gearset 812 of FIG. 8 can include any number of gears to transfer rotational motion from the second gear 824 of the ball screw 810 to the shaft 406.

As mentioned above, the EMCU 412 of FIGS. 4 and 8 includes the switch 420. The switch 420 of FIGS. 4 and 8 selectively operatively connects the electric motor 418 of the EMA 404 of FIGS. 4 and 8 to the electrical system 348 of FIGS. 3, 4 and 8. The second FCEU 368 of FIGS. 3, 4 and 8 controls the operation of the switch 420. For example, the second FCEU 368 of FIGS. 3, 4 and 8 can send one or more command(s) to the switch 420 and/or, more generally, to the EMCU 412 of FIGS. 4 and 8 that cause(s) the switch 420 to be positioned in either an open position in which the electrical system 348 of FIGS. 3, 4 and 8 is not connected to the electric motor 418 of the EMA 404 of FIGS. 4 and 8, or in a closed position in which the electrical system 348 of FIGS. 3, 4 and 8 is connected to the electric motor 418 of the EMA 404 of FIGS. 4 and 8.

In some examples, the second FCEU 368 of FIGS. 3, 4 and 8 commands the switch 420 of FIGS. 4 and 8 into either the open position or the closed position based on a determination made by the hydraulic status monitor 422 of the second FCEU 368 of FIGS. 3, 4 and 8 as to whether the hydraulic system 330 and/or the hydraulic module 408 of FIGS. 3, 4, 6 and 7 has/have failed (e.g., whether the hydraulic system 330 and/or the hydraulic module 408 is/are experiencing loss or reduction of pressurized hydraulic fluid). If the hydraulic status monitor 422 of the second FCEU 368 of FIGS. 3, 4 and 8 determines that there is a hydraulic failure of either the hydraulic system 330 or the hydraulic module 408 if FIGS. 3, 4, 6 and 7, the second FCEU 368 sends one or more command(s) to the switch 420 and/or the EMCU 412 of FIGS. 4 and 8 that cause(s) the switch 420 to move to the closed position. In response to the switch 420 being moved to the closed position, the electrical system 348 of FIGS. 3, 4 and 8 becomes connected to the electric motor 418 of the EMA 404 of FIGS. 4 and 8.

In the illustrated example of FIG. 8, the EMA 404 further includes an example electric brake 828 operatively positioned between the electric motor 418 and the output gear 826. The electric brake 828 selectively operatively couples the electric motor 418 to the output gear 826 to selectively enable the electric motor 418 to drive and/or rotate the output gear 826. For example, the electric brake 828 can be moved and/or actuated into a first state in which the electric brake 828 operatively couples the electric motor 418 to the output gear 826, such that rotation of an element (e.g., a motor shaft) of the electric motor 418 causes rotation of the output gear 826, and vice-versa. The electric brake 828 can alternatively be moved and/or actuated into a second state in which the electric brake 828 does not operatively couple the electric motor 418 to the output gear 826, such that rotation of the element (e.g., the motor shaft) of the electric motor does not cause rotation of the output gear 826, and vice-versa. In some examples, the electric brake 828 can be implemented via one or more brake disc(s) that is/are movable and/or actuatable via a solenoid valve controlled by either the EMCU 412 or the second FCEU 368. In the illustrated example of FIGS. 4 and 8, the above-described electrical signals and/or connections between the electric brake 828 and either of the EMCU 412 or the second FCEU 368 are omitted in the interest of clarity of the figures.

In some examples, the electric brake 828 is engaged and/or activated in connection with a first operational mode (e.g., active mode) of the EMA 404. When the electric brake 828 is engaged and/or activated, the electric motor 418 rotates the output gear 826. Rotation of the output gear 826 via the electric motor 418 causes rotation of the first gear 822 of the ball screw 810, which in turn causes rotation of the ball screw 810, which in turn causes translation of the ball nut 808 relative to the case 806. Rotation of the first gear 822 of the ball screw 810 via the output gear 826 also causes rotation of the second gear 824 of the ball screw 810, which in turn causes rotation of the gearset 812, which in turn causes rotation of the shaft 406. The HMA 402 is in the second operational mode (e.g., bypassed mode) when the EMA 404 is in the first operational mode (e.g., active mode). When the HMA 402 is in the second operational mode (e.g., bypassed mode) and the EMA 404 is in the first operational mode (e.g., active mode), movement of the HMA 402 is controlled by the EMA 404 via the shaft 406.

In some examples, the electric brake 828 is disengaged and/or deactivated in connection with a second operational mode (e.g., a floated mode) of the EMA 404. When the electric brake 828 is disengaged and/or deactivated, the electric motor 418 does not actively rotate the output gear 826, and the electric motor 418 accordingly has no control over the rotation of the ball screw 810 and/or the translation of the ball nut 808. When the electric brake 828 is disengaged and/or deactivated, the shaft 406 can rotate the gearset 812 of the EMA 404. Rotation of the gearset 812 via the shaft 406 causes rotation of the second gear 824 of the ball screw 810, which in turn causes rotation of the ball screw 810, which in turn causes translation of the ball nut 808 relative to the case 806. The HMA 402 is in the first operational mode (e.g., active mode) when the EMA 404 is in the second operational mode (e.g., floated mode). When the HMA 402 is in the first operational mode (e.g., active mode) and the EMA 404 is in the second operational mode (e.g., floated mode), movement of the EMA 404 is controlled by the HMA 402 via the shaft 406.

In the illustrated example of FIG. 8, the actuator position feedback sensor 816 is coupled to and/or mounted on the ball screw 810. The actuator position feedback sensor 816 senses, measures and/or detects a number of revolutions of the ball screw 810, a position of the ball screw 810 (e.g., a rotational position of the ball screw 810 relative to the case 806), and/or a position of the ball nut 808 (e.g., a translational position of the ball nut 808 relative to the case 806). The actuator position feedback sensor 816 of FIG. 8 is operatively coupled to (e.g., in electrical communication with) either the EMCU 412 or the second FCEU 368 such that the EMCU 412 or the second FCEU 368 can receive and/or obtain actuator position feedback data sensed, measured and/or detected via the actuator position feedback sensor 816. Actuator position feedback data obtained by the EMCU 412 can be conveyed to the second FCEU 368 via the second databus 374. In the illustrated example of FIGS. 4 and 8, the above-described electrical signals and/or connections between the actuator position feedback sensor 816 and either the EMCU 412 or the second FCEU 368 are omitted in the interest of clarity of the figures.

The EMA 404 of FIGS. 4 and 8 can be actuated by either of two independent mechanisms. First, the EMA 404 can be actuated via the shaft 406 under the control of the HMA 402 when the hydraulic system 330 and the hydraulic module 408 are operational, functional, and/or active. Second, in the event of a failure of the hydraulic system 330 or the hydraulic module 408, the EMA 404 can alternatively be actuated via the electric motor 418 of the EMA 404 in response to the electric motor 418 being connected to the electrical system 348, and further in response to the electric brake 828 being engaged to couple the electric motor 418 to the output gear 826.

Figure 9:
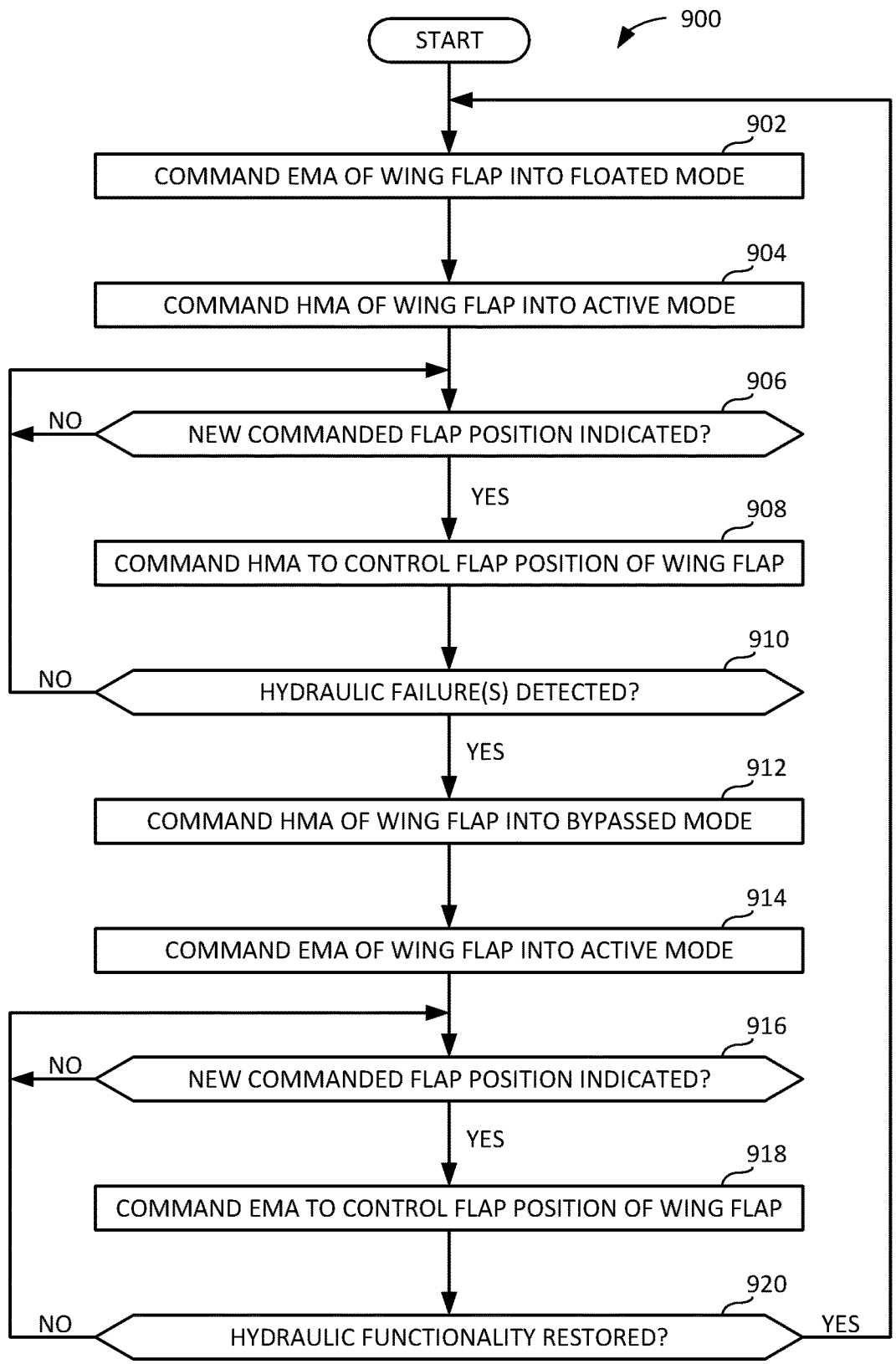
FIG. 9 is a flowchart representative of an example method for implementing the example distributed trailing edge wing flap system of FIGS. 3-8 to control the position of a wing flap.

FIG. 9 is a flowchart representative of an example method 900 for implementing the example distributed trailing edge wing flap system 300 of FIGS. 3-8 to control the position of a wing flap. The method 900 of FIG. 9 begins with commanding an EMA of a wing flap of the distributed trailing edge wing flap system 300 into a floated mode (block 902). For example, the second FCEU 368 of FIGS. 3, 4 and 8 can command the EMA 404 of FIGS. 4 and 8 of the wing flap (e.g., the first inboard flap 112 of FIG. 3) into the floated mode. In some examples, the second FCEU 368 of FIGS. 3, 4 and 8 can command the EMA 404 of FIGS. 4 and 8 into the floated mode by opening the switch 420 of the EMCU 412 of FIGS. 4 and 8 to disconnect the electrical system 348 of FIGS. 3, 4 and 8 from the electric motor 418 of the EMA 404 of FIGS. 4 and 8, and/or by disengaging the electric brake 828 of the EMA 404 of FIGS. 4 and 8 from the electric motor 418 of the EMA 404 of FIGS. 4 and 8. Following block 902, the method 900 of FIG. 9 proceeds to block 904.

The method 900 of FIG. 9 includes commanding an HMA of the wing flap of the distributed trailing edge wing flap system 300 into an active mode (block 904). For example, the first FCEU 366 of FIGS. 3, 4, 6 and 7 can command the HMA 402 of FIGS. 4 and 5 of the wing flap (e.g., the first inboard flap 112 of FIG. 3), via the hydraulic module 408 and the REU 410 of FIGS. 4, 6 and 7, into the active mode described above in connection with FIG. 6. Following block 904, the method 900 of FIG. 9 proceeds to block 906.

The method 900 of FIG. 9 includes determining whether a new commanded flap position of the wing flap is indicated by the distributed trailing edge wing flap system 300 (block 906). For example, the first FCEU 366 of FIGS. 3, 4, 6 and 7 can determine that a new commanded flap position of the wing flap is indicated based on one or more input(s) received at the first FCEU 366 from the flap lever 370 of FIG. 3. If the first FCEU 366 determines at block 906 that a new commanded flap position is not indicated, the method 900 of FIG. 9 remains at block 906. If the first FCEU 366 instead determines at block 906 that a new commanded flap position is indicated, the method 900 of FIG. 9 proceeds to block 908.

The method 900 of FIG. 9 includes commanding the HMA of the wing flap to control the flap position of the wing flap (block 908). For example, the first FCEU 366 of FIGS. 3, 4, 6 and 7 can command the HMA 402 of FIGS. 4 and 5, via the hydraulic module 408 and the REU 410 of FIGS. 4, 6 and 7, to control the flap position of the wing flap. In some examples, the first FCEU 366 of FIGS. 3, 4, 6 and 7 can command the HMA 402 of FIGS. 4 and 5, via the hydraulic module 408 and the REU 410 of FIGS. 4 and 5, to position the wing flap in a flap position corresponding to the new commanded flap position determined at block 906. Following block 908, the method 900 of FIG. 9 proceeds to block 910.

The method 900 of FIG. 9 includes detecting whether the distributed trailing edge wing flap system 300 is experiencing one or more hydraulic failure(s) (block 910). For example, the hydraulic status monitor 422 of the second FCEU 368 of FIGS. 3, 4 and 8 can detect one or more hydraulic failure(s) (e.g., loss(es) or reduction(s) in pressurized hydraulic fluid) of the hydraulic system 330 and/or the hydraulic module 408 of FIGS. 3, 4, 6 and 7. If the hydraulic status monitor 422 of the second FCEU 368 does not detect any hydraulic failure(s) at block 910, the method 900 of FIG. 9 returns to block 906. If the hydraulic status monitor 422 of the second FCEU 368 instead detects one or more hydraulic failure(s) at block 910, the method 900 of FIG. 9 proceeds to block 912.

The method 900 of FIG. 9 includes commanding the HMA of the wing flap of the distributed trailing edge wing flap system 300 into a bypassed mode (block 912). For example, the first FCEU 366 of FIGS. 3, 4, 6 and 7 can command the HMA 402 of FIGS. 4 and 5, via hydraulic module 408 and the REU 410 of FIGS. 4, 6 and 7, into the bypassed mode described above in connection with FIG. 7. Following block 912, the method 900 of FIG. 9 proceeds to block 914.

The method 900 of FIG. 9 includes commanding the EMA of the wing flap of the distributed trailing edge wing flap system 300 into an active mode (block 914). For example, the second FCEU 368 of FIGS. 3, 4 and 8 can command the EMA 404 of FIGS. 4 and 8 of the wing flap into the active mode. In some examples, the second FCEU 368 of FIGS. 3, 4 and 8 can command the EMA 404 of FIGS. 4 and 8 into the active mode by closing the switch 420 of the EMCU 412 of FIGS. 4 and 8 to connect the electrical system 348 of FIGS. 3, 4 and 8 to the electric motor 418 of the EMA 404 of FIGS. 4 and 8, and by engaging the electric brake 828 of the EMA 404 of FIGS. 4 and 8 with the electric motor 418 of the EMA 404 of FIGS. 4 and 8. Following block 914, the method 900 of FIG. 9 proceeds to block 916.

The method 900 of FIG. 9 includes determining whether a new commanded flap position of the wing flap is indicated by the distributed trailing edge wing flap system 300 (block 916). For example, the first FCEU 366 of FIGS. 3, 4, 6 and 7 can determine that a new commanded flap position of the wing flap is indicated based on one or more input(s) received at the first FCEU 366 from the flap lever 370 of FIG. 3. If the first FCEU 366 determines at block 916 that a new commanded flap position is not indicated, the method 900 of FIG. 9 remains at block 916. If the first FCEU 366 instead determines at block 916 that a new commanded flap position is indicated, the method 900 of FIG. 9 proceeds to block 918.

The method 900 of FIG. 9 includes commanding the EMA of the wing flap to control the flap position of the wing flap (block 918). For example, the second FCEU 368 of FIGS. 3, 4 and 8 can command the EMA 404 of FIGS. 4 and 8, via the EMCU 412, the electric motor 418, and/or the electric brake 828 of FIGS. 4 and 8, to control the flap position of the wing flap. In some examples, the second FCEU 368 of FIGS. 3, 4 and 8 can command the EMA 404 of FIGS. 4 and 5, via the EMCU 412, the electric motor 418, and/or the electric brake 828 of FIGS. 4 and 8, to position the wing flap in a flap position corresponding to the new commanded flap position determined at block 916. Following block 918, the method 900 of FIG. 9 proceeds to block 920.

The method 900 of FIG. 9 includes determining whether the hydraulic functionality (e.g., the hydraulic operability) of the distributed trailing edge wing flap system 300 has been restored (block 920). For example, the hydraulic status monitor 422 of the second FCEU 368 of FIGS. 3, 4 and 8 can determine that the hydraulic functionality associated with the hydraulic failure(s) of the hydraulic system 330 and/or the hydraulic module 408 of FIGS. 3, 4, 6 and 7 detected at block 910 has been restored to a functional and/or operative state. If the hydraulic status monitor 422 of the second FCEU 368 determines at block 920 that the hydraulic functionality has not been restored, the method 900 of FIG. 9 returns to block 916. If the hydraulic status monitor 422 of the second FCEU 368 instead determines at block 920 that the hydraulic functionality has been restored, the method 900 of FIG. 9 returns to block 902.

Figure 10:
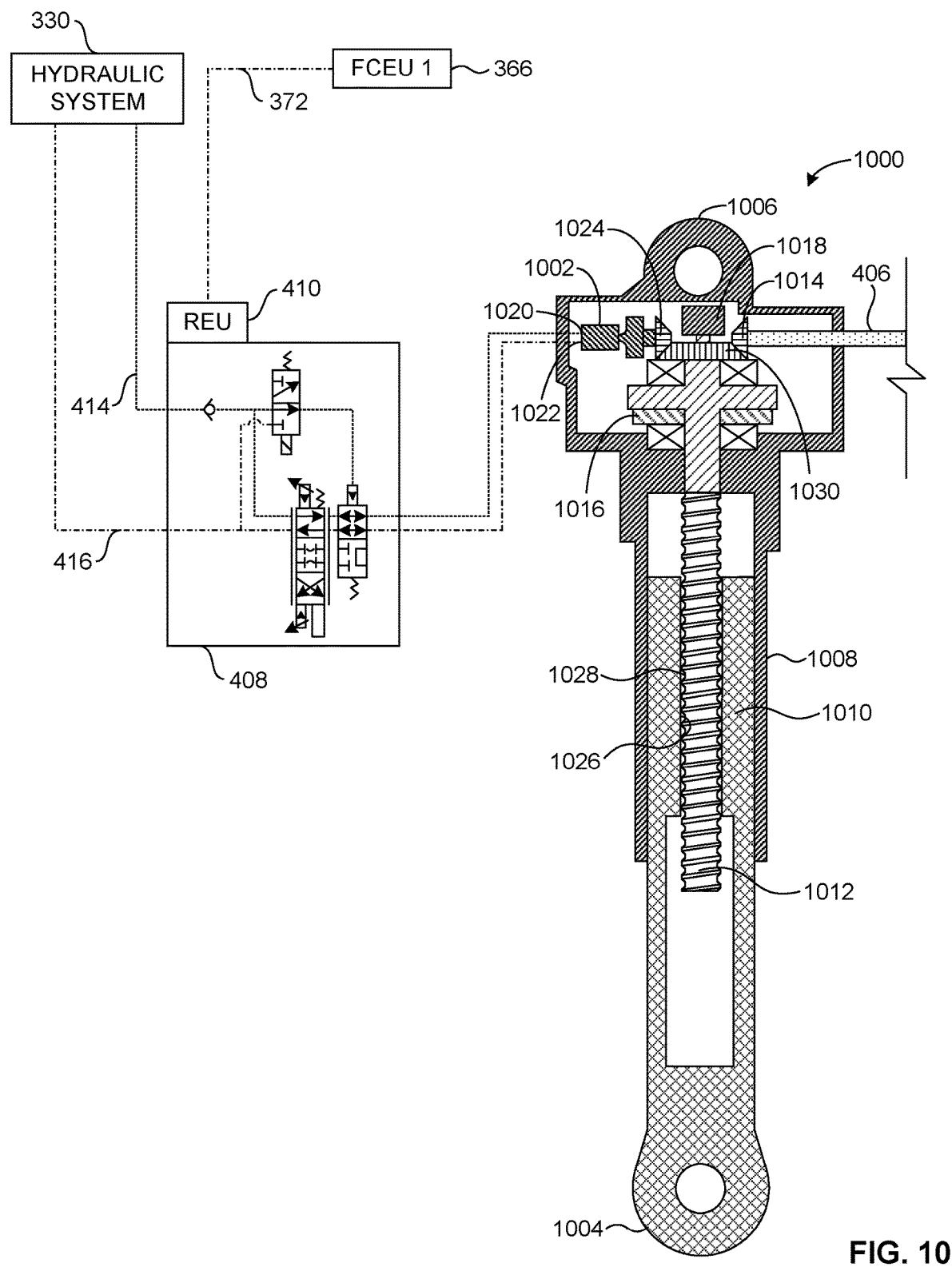
FIG. 10 is a schematic of an alternate example hydromechanical actuator that may be implemented in the example subsystem of FIG. 4 in place of the example hydromechanical actuator of FIGS. 4 and 5.

FIG. 10 is a schematic of an alternate example HMA 1000 that may be implemented in the example subsystem 400 of FIG. 4 in place of the example HMA 402 of FIGS. 4 and 5 described above. The HMA 1000 of FIG. 10 is configured to interface with the example shaft 406 and the example hydraulic module 408 of FIGS. 4, 6 and 7. In the interest of conciseness, the structure and operation of the shaft 406 and the hydraulic module 408 described above are not repeated herein. In the illustrated example of FIG. 10, the HMA 1000 includes an example hydraulic motor 1002, an example first end 1004, an example second end 1006 located opposite the first end 1004, an example case 1008, an example ball nut 1010, an example ball screw 1012, an example gearset 1014, an example no-back device 1016, and an example actuator position feedback sensor 1018.

The HMA 1000 of FIG. 10 can be powered, controlled, and/or operated via the hydraulic motor 1002. In the illustrated example of FIG. 10, the hydraulic motor 1002 includes a first example port 1020, a second example port 1022, and an example output gear 1024. The hydraulic motor 1002 can be powered via pressurized hydraulic fluid supplied by the hydraulic system 330 and received from the hydraulic module 408 at the first port 1020 or the second port 1022 of the hydraulic motor 1002. Supplying pressurized hydraulic fluid from the hydraulic module 408 to the first port 1020 of the hydraulic motor 1002 causes the hydraulic motor 1002 to rotate the output gear 1024 in a first rotational direction (e.g., clockwise). Supplying pressurized hydraulic fluid from the hydraulic module 408 to the second port 1022 of the hydraulic motor 1002 causes the hydraulic motor 1002 to rotate the output gear 1024 in a second rotational direction (e.g., counter-clockwise) opposite the first rotational direction. Movement (e.g., rotation) of the output gear 1024 of the hydraulic motor 1002 is further discussed below.

The first end 1004 of the HMA 1000 can be coupled to a linkage assembly (e.g., the first linkage assembly 206 of FIGS. 2A-2C) of a wing flap (e.g., the first inboard flap 112, the first outboard flap 114, the second inboard flap 118, or the second outboard flap 120 of FIGS. 1 and 3), and the second end 1006 of the HMA 1000 can be coupled to a corresponding wing (e.g., the first wing 102 or the second wing 104 of FIGS. 1 and 3). The case 1008, the ball nut 1010, and the ball screw 1012 of the HMA 1000 have respective fixed lengths. The ball nut 1010 is configured to receive the ball screw 1012. The ball nut 1010 is positioned, disposed, and/or received within the case 1008 and is movable and/or slidable, but not rotatable, relative to the case 1008 between a retracted position and an extended position. In some examples, the HMA 1000 of FIG. 10 has a first length when the ball nut 1010 is in the retracted position relative to the case 1008, and a second length greater than the first length when the ball nut 1010 is in the extended position relative to the case 1008.

In the illustrated example of FIG. 10, the ball nut 1010 includes an example threaded portion 1026. The ball screw 1012 includes an example threaded portion 1028 configured to engage the threaded portion 1026 of the ball nut 1010. Movement (e.g., rotation) of the ball screw 1012 of the HMA 1000 in a first rotational direction causes movement (e.g., translation) of the ball nut 1010 of the HMA 1000 relative to the case 1008 of the HMA 1000 in a first translational direction. For example, rotating the ball screw 1012 of FIG. 10 in a clockwise direction can cause the ball nut 1010 of FIG. 10 to move and/or slide relative to the case 1008 of FIG. 10 away from a retracted position and toward an extended position. A wing flap coupled via a linkage assembly to the first end 1004 of the HMA 1000 can move away from a retracted position and toward a deployed position in response to the ball nut 1010 moving away from the retracted position and toward the extended position.

Conversely, movement (e.g., rotation) of the ball screw 1012 of the HMA 1000 in a second rotational direction opposite the first rotational direction causes movement (e.g., translation) of the ball nut 1010 of the HMA 1000 relative to the case 1008 of the HMA 1000 in a second translational direction opposite the first translational direction. For example, rotating the ball screw 1012 of FIG. 10 in a counter-clockwise direction can cause the ball nut 1010 of FIG. 10 to move and/or slide relative to the case 1008 of FIG. 10 away from an extended position and toward a retracted position. A wing flap coupled via a linkage assembly to the first end 1004 of the HMA 1000 can move away from a deployed position and toward a retracted position in response to the ball nut 1010 moving away from the extended position and toward the retracted position. Balls that function with the ball nut 1010 and the ball screw 1012 are omitted from FIG. 10 in the interest of clarity of the figure.

The no-back device 1016 of FIG. 10 is operatively coupled to the ball screw 1012 of the HMA 1000. The no-back device 1016 is a passive braking device structured to enable only the HMA 1000 to provide an actuation power flow. The no-back device 1016 brakes and/or locks the ball screw 1012 of the HMA 1000 against any induced rotation by reason of an axial loading (e.g., tension or compression) on the ball nut 1010 of the HMA 1000, as can occur in response to a failure (e.g., loss or reduction of pressurized hydraulic fluid) of the hydraulic system 330.

In the illustrated example of FIG. 10, the ball screw 1012 further includes an example first gear 1030. The first gear 1030 of the ball screw 1012 can be coupled to and/or integrally formed with the ball screw 1012. The first gear 1030 of the ball screw 1012 engages the output gear 1024 of the hydraulic motor 1002 of the HMA 1000, and also engages the gearset 1014 of the HMA 1000, which in turn engages the shaft 406. The gearset 1014 of FIG. 10 can include any number of gears to transfer rotational motion from the first gear 1030 of the ball screw 1012 to the shaft 406.

The hydraulic motor 1002 can control the actuation of the HMA 1000 when the hydraulic system 330 and the hydraulic module 408 are functional (e.g., such that pressurized hydraulic fluid can be supplied to the first port 1020 or the second port 1022 of the hydraulic motor 1002). For example, the hydraulic motor 1002 can control the actuation of the HMA 1000 when the hydraulic system 330 and the hydraulic module 408 are functional, and the hydraulic module 408 is in the active mode shown in FIGS. 6 and 10. Powering the hydraulic motor 1002 via pressurized hydraulic fluid supplied to the first port 1020 or the second port 1022 of the hydraulic motor 1002 causes the output gear 1024 of the hydraulic motor 1002 to rotate. Rotation of the output gear 1024 via the hydraulic motor 1002 causes rotation of the first gear 1030 of the ball screw 1012, which in turn causes rotation of the ball screw 1012, which in turn causes translation of the ball nut 1010 relative to the case 1008. Rotation of the first gear 1030 of the ball screw 1012 via the output gear 1024 also causes rotation of the gearset 1014, which in turn causes rotation of the shaft 406. When the HMA 1000 is in the first operational mode (e.g., active mode) and the EMA 404 is in the second operational mode (e.g., floated mode), movement of the EMA 404 is controlled by the HMA 1000 via the shaft 406.

The hydraulic motor 1002 is unable to control the actuation of the HMA 1000 when the hydraulic system 330 and/or the hydraulic module 408 is/are non-functional (e.g., such that pressurized hydraulic fluid cannot be supplied to the first port 1020 or the second port 1022 of the hydraulic motor 1002). For example, the hydraulic motor 1002 is unable to control the actuation of the HMA 1000 when the hydraulic system 330 and/or the hydraulic module 408 is/are non-functional, and the hydraulic module 408 is in the bypassed mode shown in FIG. 7 above. When the HMA 1000 is in the second operational mode (e.g., bypassed mode) and the EMA 404 is in the first operational mode (e.g., active mode), movement of the HMA 1000 is controlled by the EMA 404 via the shaft 406. Rotation of the shaft 406 via the EMA 404 causes rotation of the gearset 1014 of the HMA 1000. Rotation of the gearset 1014 via the shaft 406 causes rotation of the first gear 1030 of the ball screw 1012, which in turn causes rotation of the ball screw 1012, which in turn causes translation of the ball nut 1010 relative to the case 1008.

In the illustrated example of FIG. 10, the actuator position feedback sensor 1018 is coupled to and/or mounted on the ball screw 1012. The actuator position feedback sensor 1018 senses, measures and/or detects a number of revolutions of the ball screw 1012, a position of the ball screw 1012 (e.g., a rotational position of the ball screw 1012 relative to the case 1008), and/or a position of the ball nut 1010 (e.g., a translational position of the ball nut 1010 relative to the case 1008). The actuator position feedback sensor 1018 of FIG. 10 is operatively coupled to (e.g., in electrical communication with) the REU 410 such that the REU 410 can receive and/or obtain actuator position feedback data sensed, measured and/or detected via the actuator position feedback sensor 1018. Actuator position feedback data obtained by the REU 410 can be conveyed to the first FCEU 366 via the first databus 372. In the illustrated example of FIG. 10, the above-described electrical signals and/or connections between the actuator position feedback sensor 1018 and the REU 410 are omitted in the interest of clarity of the figures. In some examples, a dispatch requirement of the aircraft results in a higher availability requirement for the distributed trailing edge wing flap system and, as such, a single electrical channel in the SOV 604, EHSV 602, and actuator position feedback sensor 1018 is increased to dual electrical channels whereby one electrical channel interfaces with one REU and the other electrical channel interfaces with a different REU.

The HMA 1000 of FIG. 10 can be actuated by either of two independent mechanisms. First, the HMA 1000 can be actuated via the hydraulic system 330, the hydraulic module 408, and the hydraulic motor 1002 when the hydraulic system 330 and the hydraulic module 408 are operational, functional, and/or active. Second, in the event of a failure of the hydraulic system 330 or the hydraulic module 408, the HMA 1000 can alternatively be actuated via the shaft 406 under the control of the EMA 404 of FIGS. 4 and 8.

From the foregoing, it will be appreciated that the disclosed distributed trailing edge wing flap systems advantageously include an HMA and an EMA to move a wing flap relative to the fixed trailing edge of an aircraft wing. The HMA is actuatable via pressurized hydraulic fluid to be supplied from a hydraulic system of the aircraft to the HMA via a hydraulic module operatively coupled to the HMA. The EMA is actuatable via an electric motor of the EMA that is selectively connectable to an electrical system of the aircraft. A shaft operatively couples the HMA to the EMA.

The HMA can advantageously be actuated by either of two independent mechanisms. First, the HMA can be actuated via the hydraulic module when the hydraulic system is operational, functional, and/or active. Second, in the event of a failure of the hydraulic system, the HMA can alternatively be actuated via the shaft under the control of the EMA. The EMA can also advantageously be actuated by either of two independent mechanisms. First, the EMA can be actuated via the shaft under the control of the HMA when the hydraulic system is operational, functional, and/or active. Second, in the event of a failure of the hydraulic system, the EMA can alternatively be actuated via the electric motor of the EMA in response to the electric motor being connected to the electrical system.

In some examples, a wing flap system for an aircraft is disclosed. In some disclosed examples, the wing flap system comprises a flap and first and second actuators. In some disclosed examples, the flap is movable between a deployed position and a retracted position relative to a fixed trailing edge of a wing of the aircraft. In some disclosed examples, the first and second actuators are configured to move the flap relative to the fixed trailing edge. In some disclosed examples, the first actuator is operatively coupled to the second actuator via a shaft. In some disclosed examples, the first actuator is actuatable via pressurized hydraulic fluid to be supplied from a hydraulic system of the aircraft to the first actuator via a hydraulic module operatively coupled to the first actuator. In some disclosed examples, the first actuator is configured to control movement of the second actuator via the shaft when the hydraulic system and the hydraulic module are functional. In some disclosed examples, the second actuator is actuatable via an electric motor of the second actuator. In some disclosed examples, the electric motor is selectively connectable to an electrical system of the aircraft. In some disclosed examples, the electric motor is connected to the electrical system in response to detection of a failure of the hydraulic system or of the hydraulic module. In some disclosed examples, the second actuator is configured to control movement of the first actuator via the shaft when the electric motor is connected to the electrical system.

In some disclosed examples, the shaft is a straight shaft or a flexible shaft. In some disclosed examples, the shaft is configured to rotate in response to actuation of the first actuator via the pressurized hydraulic fluid. In some disclosed examples, the rotation of the shaft is configured to actuate the second actuator. In some disclosed examples, the second actuator is actuatable via the rotation of the shaft independently of being actuatable via the electric motor. In some disclosed examples, the shaft is configured to rotate in response to actuation of the second actuator via the electric motor. In some disclosed examples, the rotation of the shaft is configured to actuate the first actuator. In some disclosed examples, the first actuator is actuatable via the rotation of the shaft independently of being actuatable via the pressurized hydraulic fluid.

In some disclosed examples, the wing flap system further comprises an electronic motor control unit including a switch. In some disclosed examples, the switch is operatively positioned between the electric motor and the electrical system. In some disclosed examples, the switch is actuatable between an open position and a closed position. In some disclosed examples, the electric motor is connected to the electrical system when the switch is in the closed position.

In some disclosed examples, the switch is configured to be actuated into the closed position in response to a command received by the electronic motor control unit from a flight control electronics unit of the aircraft. In some disclosed examples, the flight control electronics unit is configured to detect the failure and is further configured to send the command in response to the detecting of the failure.

In some disclosed examples, the flight control electronics unit is a second flight control electronics unit, and the wing flap system further comprises a remote electronics unit and a first flight control electronics unit. In some disclosed examples, the remote electronics unit is in electrical communication with the hydraulic module. In some disclosed examples, the remote electronics unit is configured to control the hydraulic module. In some disclosed examples, the first flight control electronics unit is configured to control the remote electronics unit.

In some disclosed examples, the remote electronics unit is located at the hydraulic module. In some disclosed examples, the hydraulic module is located remotely from the first actuator. In some disclosed examples, the electronic motor control unit is located at the second actuator. In some disclosed examples, the first flight control electronics unit is located remotely from the remote electronics unit. In some disclosed examples, the second flight control electronics unit is located remotely from the electronic motor control unit.

In some examples, a method for operating a wing flap system of an aircraft is disclosed. In some disclosed examples of the method, the wing flap system includes a flap movable between a deployed position and a retracted position relative to a fixed trailing edge of a wing of the aircraft, and further includes first and second actuators configured to move the flap relative to the fixed trailing edge, the first actuator being operatively coupled to the second actuator via a shaft. In some disclosed examples, the method comprises commanding the first actuator to control movement of the flap relative to the fixed trailing edge. In some disclosed examples, the first actuator is actuatable via pressurized hydraulic fluid to be supplied from a hydraulic system of the aircraft to the first actuator via a hydraulic module operatively coupled to the first actuator. In some disclosed examples, the first actuator controls movement of the second actuator via the shaft when the hydraulic system and the hydraulic module are functional. In some disclosed examples, the method comprises detecting a failure of the hydraulic system or of the hydraulic module. In some disclosed examples, the method comprises commanding the second actuator to control movement of the flap relative to the fixed trailing edge. In some disclosed examples, the second actuator is actuatable via an electric motor of the second actuator. In some disclosed examples, the electric motor is selectively connectable to an electrical system of the aircraft. In some disclosed examples, the electric motor is connected to the electrical system in response to the detecting the failure. In some disclosed examples, the second actuator controls movement of the first actuator via the shaft when the electric motor is connected to the electrical system.

In some disclosed examples, commanding the first actuator to control movement of the flap includes commanding the first actuator into a first active mode and commanding the second actuator into a floated mode. In some disclosed examples, commanding the second actuator to control movement of the flap includes commanding the first actuator from the first active mode into a bypassed mode, and commanding the second actuator from the floated mode into a second active mode.

In some disclosed examples, the method further comprises rotating the shaft in response to actuation of the first actuator via the pressurized hydraulic fluid. In some disclosed examples, the rotating the shaft actuates the second actuator, the second actuator being actuatable via the rotating the shaft independently of being actuatable via the electric motor.

In some disclosed examples, the method further comprises rotating the shaft in response to actuation of the second actuator via the electric motor. In some disclosed examples, the rotating the shaft actuates the first actuator, the first actuator being actuatable via the rotating the shaft independently of being actuatable via the pressurized hydraulic fluid.

In some disclosed examples, the method further comprises actuating a switch of an electronic motor control unit into a closed position. In some disclosed examples, the switch is operatively positioned between the electric motor and the electrical system. In some disclosed examples, the switch is actuatable between an open position and the closed position. In some disclosed examples, the electric motor is connected to the electrical system when the switch is in the closed position.

In some disclosed examples, the actuating the switch into the closed position is in response to the electronic motor control unit receiving a command from a flight control electronics unit of the aircraft. In some disclosed examples, the method further comprises sending the command from the flight control electronics unit to the electronic motor control unit in response to the detecting the failure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A wing flap system for an aircraft, the wing flap system comprising:
   a flap movable between a deployed position and a retracted position relative to a fixed trailing edge of a wing of the aircraft; and
   first and second actuators configured to move the flap relative to the fixed trailing edge, the first actuator being operatively coupled to the second actuator via a shaft, the first actuator being actuatable via pressurized hydraulic fluid to be supplied from a hydraulic system of the aircraft to the first actuator via a hydraulic module operatively coupled to the first actuator, the hydraulic module being in fluid communication with the hydraulic system and the first actuator, the first actuator configured to control movement of the second actuator via the shaft when the hydraulic system and the hydraulic module are functional, the second actuator being actuatable via an electric motor of the second actuator, the electric motor being selectively connectable to an electrical system of the aircraft, the electric motor being connected to the electrical system in response to detection of a failure of the hydraulic system or of the hydraulic module, the second actuator configured to control movement of the first actuator via the shaft when the electric motor is connected to the electrical system.

2. The wing flap system of claim 1, wherein the shaft is a straight shaft or a flexible shaft.

3. The wing flap system of claim 1, wherein the shaft is configured to rotate in response to actuation of the first actuator via the pressurized hydraulic fluid.

4. The wing flap system of claim 3, wherein the rotation of the shaft is configured to actuate the second actuator, the second actuator being actuatable via the rotation of the shaft independently of being actuatable via the electric motor.

5. The wing flap system of claim 1, wherein the shaft is configured to rotate in response to actuation of the second actuator via the electric motor.

6. The wing flap system of claim 5, wherein the rotation of the shaft is configured to actuate the first actuator, the first actuator being actuatable via the rotation of the shaft independently of being actuatable via the pressurized hydraulic fluid.

7. The wing flap system of claim 1, further comprising an electronic motor control unit including a switch, the switch being operatively positioned between the electric motor and the electrical system, the switch being actuatable between an open position and a closed position, the electric motor being connected to the electrical system when the switch is in the closed position.

8. The wing flap system of claim 7, wherein the switch is configured to be actuated into the closed position in response to a command received by the electronic motor control unit from a flight control electronics unit of the aircraft.

9. The wing flap system of claim 8, wherein the flight control electronics unit is configured to detect the failure and is further configured to send the command in response to the detecting of the failure.

10. The wing flap system of claim 8, wherein the flight control electronics unit is a second flight control electronics unit, the wing flap system further comprising:
    a remote electronics unit in electrical communication with the hydraulic module, the remote electronics unit configured to control the hydraulic module; and
    a first flight control electronics unit configured to control the remote electronics unit.

11. The wing flap system of claim 10, wherein the remote electronics unit is located at the hydraulic module, the hydraulic module is located remotely from the first actuator, the electronic motor control unit is located at the second actuator, the first flight control electronics unit is located remotely from the remote electronics unit, and the second flight control electronics unit is located remotely from the electronic motor control unit.

12. A method for operating a wing flap system of an aircraft, the wing flap system including a flap movable between a deployed position and a retracted position relative to a fixed trailing edge of a wing of the aircraft and further including first and second actuators configured to move the flap relative to the fixed trailing edge, the first actuator being operatively coupled to the second actuator via a shaft, the method comprising:
    commanding the first actuator to control movement of the flap relative to the fixed trailing edge, the first actuator being actuatable via pressurized hydraulic fluid to be supplied from a hydraulic system of the aircraft to the first actuator via a hydraulic module operatively coupled to the first actuator, the hydraulic module being in fluid communication with the hydraulic system and the first actuator, the first actuator controlling movement of the second actuator via the shaft when the hydraulic system and the hydraulic module are functional;
    detecting a failure of the hydraulic system or of the hydraulic module; and
    commanding the second actuator to control movement of the flap relative to the fixed trailing edge, the second actuator being actuatable via an electric motor of the second actuator, the electric motor being selectively connectable to an electrical system of the aircraft, the electric motor being connected to the electrical system in response to the detecting the failure, the second actuator controlling movement of the first actuator via the shaft when the electric motor is connected to the electrical system.

13. The method of claim 12, wherein commanding the first actuator to control movement of the flap includes commanding the first actuator into a first active mode and commanding the second actuator into a floated mode.

14. The method of claim 13, wherein commanding the second actuator to control movement of the flap includes commanding the first actuator from the first active mode into a bypassed mode, and commanding the second actuator from the floated mode into a second active mode.

15. The method of claim 12, further comprising rotating the shaft in response to actuation of the first actuator via the pressurized hydraulic fluid.

16. The method of claim 15, wherein the rotating the shaft actuates the second actuator, the second actuator being actuatable via the rotating the shaft independently of being actuatable via the electric motor.

17. The method of claim 12, further comprising rotating the shaft in response to actuation of the second actuator via the electric motor.

18. The method of claim 17, wherein the rotating the shaft actuates the first actuator, the first actuator being actuatable via the rotating the shaft independently of being actuatable via the pressurized hydraulic fluid.

19. The method of claim 12, further comprising actuating a switch of an electronic motor control unit into a closed position, the switch being operatively positioned between the electric motor and the electrical system, the switch being actuatable between an open position and the closed position, the electric motor being connected to the electrical system when the switch is in the closed position.

20. The method of claim 19, wherein the actuating the switch into the closed position is in response to the electronic motor control unit receiving a command from a flight control electronics unit of the aircraft.

21. The method of claim 20, further comprising sending the command from the flight control electronics unit to the electronic motor control unit in response to the detecting the failure.

22. A wing flap system for an aircraft, the wing flap system comprising:
 a flap movable between a deployed position and a retracted position relative to a fixed trailing edge of a wing of the aircraft; and
 first and second actuators configured to move the flap relative to the fixed trailing edge, the first actuator being operatively coupled to the second actuator via a shaft, the shaft having a first end mechanically coupled to the first actuator and a second end located opposite the first end and mechanically coupled to the second actuator, the first actuator being actuatable via pressurized hydraulic fluid to be supplied from a hydraulic system of the aircraft to the first actuator via a hydraulic module operatively coupled to the first actuator, the hydraulic module being in fluid communication with the hydraulic system and the first actuator, the first actuator configured to control movement of the second actuator via the shaft when the hydraulic system and the hydraulic module are functional, the second actuator being actuatable via an electric motor of the second actuator, the electric motor being selectively connectable to an electrical system of the aircraft, the electric motor being connected to the electrical system in response to detection of a failure of the hydraulic system or of the hydraulic module, the second actuator configured to control movement of the first actuator via the shaft when the electric motor is connected to the electrical system.

* * * * *